(12) United States Patent
Kim et al.

(10) Patent No.: US 11,710,173 B2
(45) Date of Patent: Jul. 25, 2023

(54) ELECTRONIC DEVICE FOR PERFORMING PAYMENT AND OPERATION METHOD THEREFOR

(71) Applicant: Samsung Electronics Co., Ltd., Suwon-si (KR)

(72) Inventors: Ik-Hyun Kim, Seoul (KR); Moon-Young Woo, Suwon-si (KR); Bo-Kun Choi, Seoul (KR); Sang-Hyo Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 378 days.

(21) Appl. No.: 16/496,797

(22) PCT Filed: Mar. 21, 2018

(86) PCT No.: PCT/KR2018/003276
§ 371 (c)(1),
(2) Date: Sep. 23, 2019

(87) PCT Pub. No.: WO2018/174551
PCT Pub. Date: Sep. 27, 2018

(65) Prior Publication Data
US 2020/0380592 A1    Dec. 3, 2020

(30) Foreign Application Priority Data
Mar. 21, 2017    (KR) .................. 10-2017-0035626

(51) Int. Cl.
*G06Q 30/00*    (2023.01)
*G06Q 30/0601*    (2023.01)
(Continued)

(52) U.S. Cl.
CPC ....... *G06Q 30/0643* (2013.01); *G06F 3/0486* (2013.01); *G06F 3/0488* (2013.01);
(Continued)

(58) Field of Classification Search
USPC .......................................................... 705/39
See application file for complete search history.

(56) References Cited

U.S. PATENT DOCUMENTS 9,582,789 B2 * 2/2017 Green .................. G06Q 20/108
9,817,846 B1 * 11/2017 Srinivasan ........ G06F 16/24578
(Continued)

FOREIGN PATENT DOCUMENTS

KR    10-2013-0027988 A    3/2013
KR    10-2014-0067882 A    6/2014
(Continued)

OTHER PUBLICATIONS

Chaitanya Reddy Mittapelli, Online Shopping, 2005, Kansas State University, pp. 14-18 (Year: 2005).*
(Continued)

*Primary Examiner* — Marissa Thein
*Assistant Examiner* — Maria S. P. Heath
(74) *Attorney, Agent, or Firm* — Jefferson IP Law, LLP

(57) ABSTRACT

Disclosed is an electronic device for processing a touch input. The electronic device may comprise: a touch screen; a biometric sensor disposed overlappingly at a position of at least a part of the touch screen; and a processor for acquiring biometric information of a user from an input relating to an object displayed through the touch screen, by using the biometric sensor, receiving a payment command associated with a payment function for the object, and performing the payment function for a product corresponding to the object by using the biometric information according to the payment command. Various other embodiments may be provided.

9 Claims, 34 Drawing Sheets

(51) Int. Cl.

| | |
|---|---|
| *G06F 3/0486* | (2013.01) |
| *G06F 3/0488* | (2022.01) |
| *G06Q 20/40* | (2012.01) |
| *H04L 9/40* | (2022.01) |
| *G06Q 20/12* | (2012.01) |
| *G06Q 20/30* | (2012.01) |
| *G06V 10/10* | (2022.01) |
| *G06V 10/22* | (2022.01) |
| *G06V 40/12* | (2022.01) |
| *G06V 40/20* | (2022.01) |

(52) U.S. Cl.
CPC ............ *G06Q 20/12* (2013.01); *G06Q 20/30* (2013.01); *G06Q 20/40145* (2013.01); *G06Q 30/0623* (2013.01); *G06V 10/17* (2022.01); *G06V 10/235* (2022.01); *G06V 40/1365* (2022.01); *G06V 40/28* (2022.01); *H04L 63/0861* (2013.01); *G06F 2203/04803* (2013.01)

(56) References Cited

U.S. PATENT DOCUMENTS

| | | | |
|---|---|---|---|
| 9,953,312 B2* | 4/2018 | Lee ................. | G06F 3/0484 |
| 10,021,458 B1* | 7/2018 | Taylor ............. | H04N 21/2187 |
| 10,621,581 B2* | 4/2020 | Van Os ........... | G06Q 20/29 |
| 2008/0142589 A1* | 6/2008 | Cummings ....... | G07G 1/009 |
| | | | 235/383 |
| 2012/0284105 A1* | 11/2012 | Li .................... | G06Q 30/06 |
| | | | 705/14.23 |
| 2013/0065648 A1 | 3/2013 | Kim et al. | |
| 2013/0282532 A1* | 10/2013 | Shihadah ......... | H04N 7/173 |
| | | | 705/27.1 |
| 2014/0201126 A1* | 7/2014 | Zadeh .............. | A61B 5/165 |
| | | | 706/52 |
| 2014/0244488 A1* | 8/2014 | Kim ................. | H04L 1/1614 |
| | | | 705/39 |
| 2014/0359757 A1* | 12/2014 | Sezan .............. | G06K 9/0002 |
| | | | 726/19 |
| 2015/0348002 A1* | 12/2015 | Van Os ........... | G06Q 20/102 |
| | | | 705/44 |
| 2016/0125415 A1 | 5/2016 | Mardikar et al. | |
| 2016/0132864 A1 | 5/2016 | Barrese et al. | |
| 2016/0171281 A1 | 6/2016 | Park et al. | |
| 2016/0260080 A1* | 9/2016 | Choi ................ | G06Q 20/3223 |
| 2017/0039544 A1 | 2/2017 | Park et al. | |
| 2017/0064065 A1 | 3/2017 | Lee et al. | |
| 2017/0109727 A1* | 4/2017 | Han ................. | G06Q 20/40145 |
| 2018/0025363 A1* | 1/2018 | Ouimet ........... | G06Q 30/02 |
| | | | 705/26.8 |
| 2018/0189468 A1 | 7/2018 | Shim et al. | |
| 2018/0240122 A1* | 8/2018 | Lee ................. | H04M 1/72454 |
| 2018/0260803 A1* | 9/2018 | Seol ............... | H04M 1/72412 |

FOREIGN PATENT DOCUMENTS

| | | |
|---|---|---|
| KR | 10-2015-0097059 A | 8/2015 |
| KR | 10-2016-0016397 A | 2/2016 |
| KR | 10-2016-0071887 A | 6/2016 |
| KR | 10-1660803 B1 | 9/2016 |
| KR | 10-2016-0120408 A | 10/2016 |
| KR | 10-1660463 B1 | 10/2016 |
| KR | 10-2017-0003193 A | 1/2017 |
| KR | 10-2017-0017279 A | 2/2017 |
| KR | 10-2017-0024438 A | 3/2017 |

OTHER PUBLICATIONS

Korean Office Action with English translation dated Aug. 2, 2021; Korean Appln. No. 10-2017-0035626.

* cited by examiner

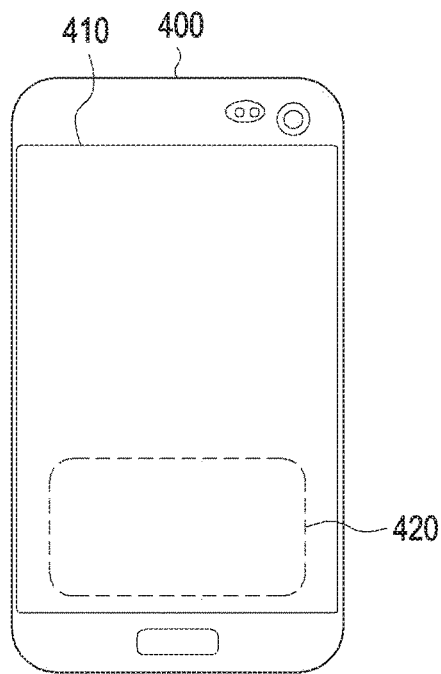
FIG.4A
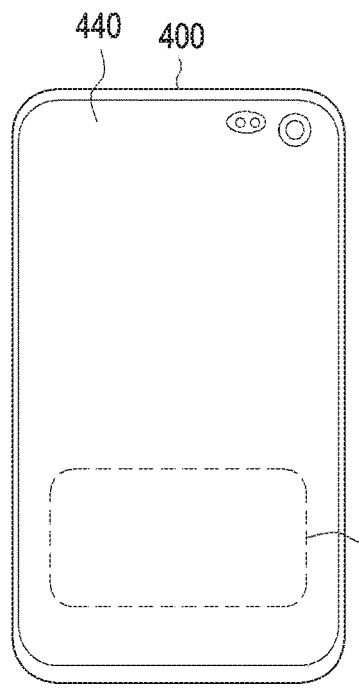 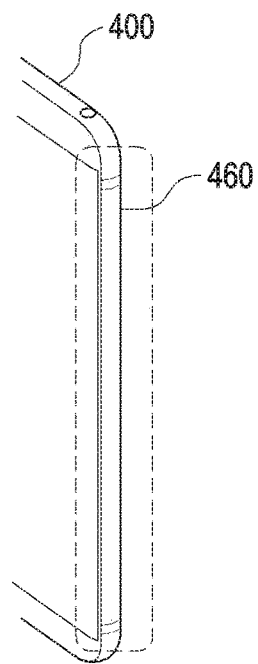
FIG.4B　　FIG.4C though the touchscreen, and perform a payment function for a product corresponding to the first object using biometric information obtained by the biometric sensor from the touch.

ELECTRONIC DEVICE FOR PERFORMING PAYMENT AND OPERATION METHOD THEREFOR

CROSS-REFERENCE TO RELATED APPLICATION(S)

This application is a U.S. National Stage application under 35 U.S.C. § 371 of an International application number PCT/KR2018/003276, filed on Mar. 21, 2018, which is based on and claimed priority of a Korean patent application number 10-2017-0035626, filed on Mar. 21, 2017, in the Korean Intellectual Property Office the disclosure of which is incorporated by reference herein in its entirety.

TECHNICAL FIELD

Various embodiments of the present invention relate to electronic devices for performing payments and methods of controlling the same.

BACKGROUND ART

The growth of electronic technology is leading to the development and spread of various types of electronic devices. Particularly in wide use are portable electronic devices with various functionalities, such as smartphones or tablet PCs.

Recently increasing is the supply of various services which may be provided to users authenticated by way of a diversity of security means such a portable electronic device provides.

DETAILED DESCRIPTION OF THE INVENTION

Technical Problem

Upon payment on an electronic device, the user may first designate a product to be paid for. The electronic device may display a payment screen for the designated product and may additionally obtain a payment command from the payment screen. In this case, the electronic device may issue a request for additional security information, e.g., password and, corresponding thereto, receive security information from the user. However, the above-described payment scheme involves several payment steps and may thus bother users who are not familiar with the payment procedure.

Technical Solution

Various embodiments relate to an electronic device capable of simultaneously designating a target product for payment and obtaining security information by simply touching on an object displayed and a method of operating the same, which enable payment for a product in a further simplified process.

According to various embodiments, an electronic device may comprise a touchscreen, a biometric sensor disposed to overlap at least a portion of the touchscreen, and a processor, wherein the processor is configured to obtain biometric information of a user from an input on an object displayed through touchscreen using the biometric sensor, receive a payment command associated with a payment function for a product corresponding to the object, and perform a payment function for the product corresponding to the object using the biometric information according to the payment command.

According to various embodiments, a method of controlling an electronic device performing payment may comprise obtaining biometric information of a user from an input on an object displayed through a touchscreen using a biometric sensor, receiving a payment command associated with a payment function for a product corresponding to the object displayed through the touchscreen, and performing the payment function for the product corresponding to the object using the biometric information according to the payment command for the product corresponding to the object.

According to various embodiments, an electronic device may comprise a touchscreen, a biometric sensor disposed to overlap at least a portion of the touchscreen, and a processor, wherein the processor may be configured to control the touchscreen to display an image including at least one object, detect a touch to a first object among the at least one object through the touchscreen, and perform a payment function for a product corresponding to the first object using biometric information obtained by the biometric sensor from the touch.

According to various embodiments, a method of controlling an electronic device performing payment may comprise controlling to display an image including at least one object on a touchscreen, detecting a touch to a first object among at least one object, and performing a payment function for a product corresponding to the first object using biometric information obtained by a biometric sensor from the touch.

Advantageous Effects

According to various embodiments, the user may make a payment using wireless communication in a simplified and convenient manner using an object purchase function displayed on the display of the electronic device. According to various embodiments, the user may perform wireless payment in a simplified and convenient manner by simplifying a product purchase function that would otherwise be complicated. A context recognition function may be added during the course of payment. Thus, the user may immediately purchase his or her desired product based on compiled information. Further, the same service may be provided to the user, with the payment service not dependent upon the product seller.

BRIEF DESCRIPTION OF DRAWINGS

FIG. 4A is a view illustrating an example biometric sensor of an electronic device according to various embodiments;

FIG. 4B is a view illustrating an example biometric sensor of an electronic device according to various embodiments;

FIG. 4C is a view illustrating an example biometric sensor of an electronic device according to various embodiments;

MODE FOR CARRYING OUT THE INVENTION

Figure 1:
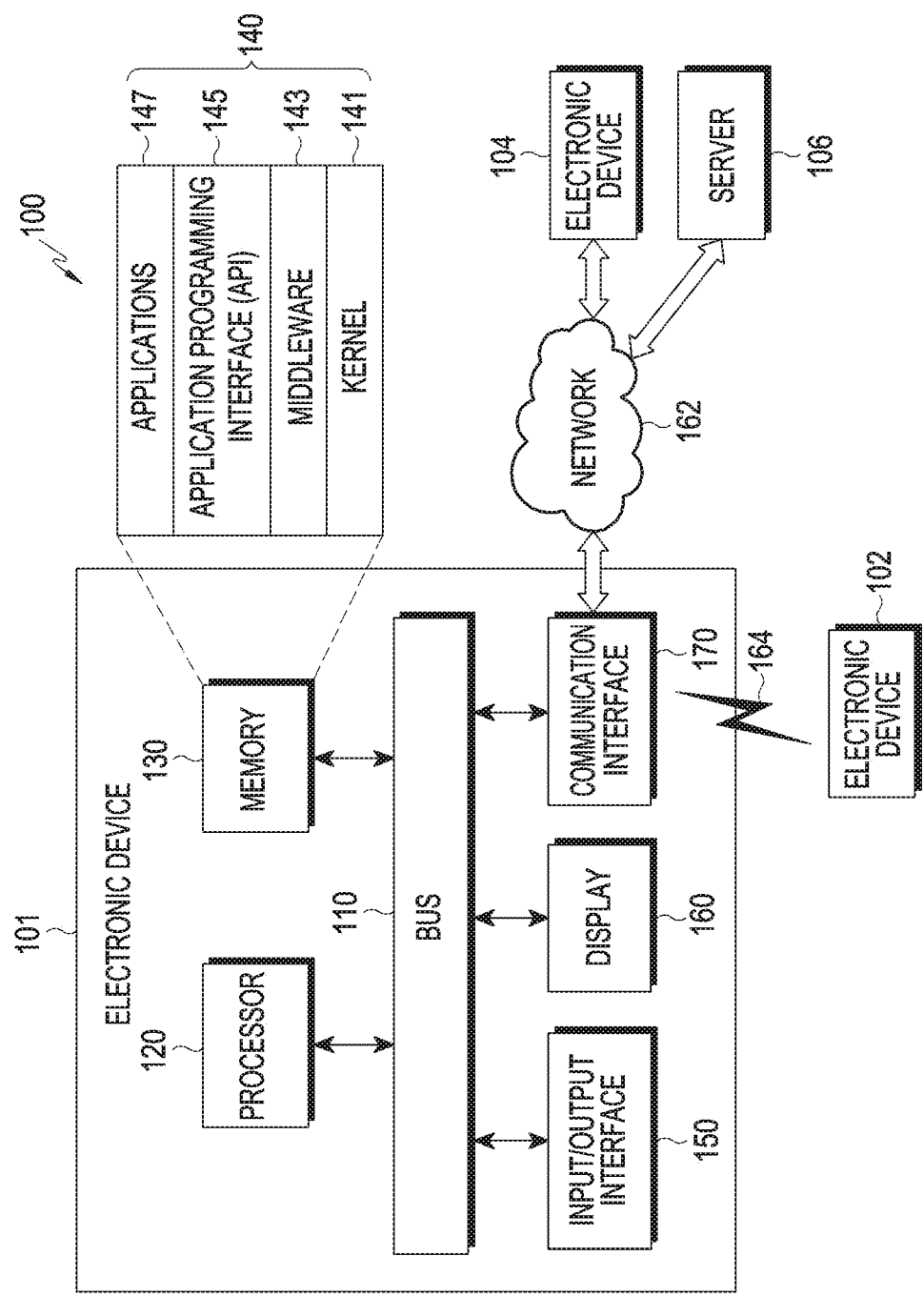
FIG. 1 is a view illustrating a network environment including an electronic device according to various embodiments.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabricor clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a dryer, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller machines (ATMs), point of sale (POS) devices, or internet of things (IoT) devices (e.g., a bulb, various sensors, a sprinkler, a fire alarm, a thermostat, a street light, a toaster, fitness equipment, a hot water tank, a heater, or a boiler). According to some embodiments, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Referring to FIG. 1, according to various embodiments, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or nonvolatile memory. For example, the memory 130 may store commands or data related to at least one other component of the electronic device 101. According to an embodiment, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UNITS), wireless broadband (Wi-Bro), or global system for mobile communication (GSM). According to an embodiment, the wireless communication may include, e.g., short-range communication 164. The wireless communication may include at least one of, e.g., wireless fidelity (Wi-Fi), light fidelity (Li-Fi), Bluetooth (BT), Bluetooth low power (BLE), Zigbee, near field communication (NFC), magnetic secure transmission (MST), radio frequency, or body area network (BAN). According to an embodiment, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to various embodiments, all or some of operations executed on the electronic device 101 may be executed on another or multiple other electronic devices (e.g., the electronic devices 102 and 104 or server 106). According to an embodiment, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
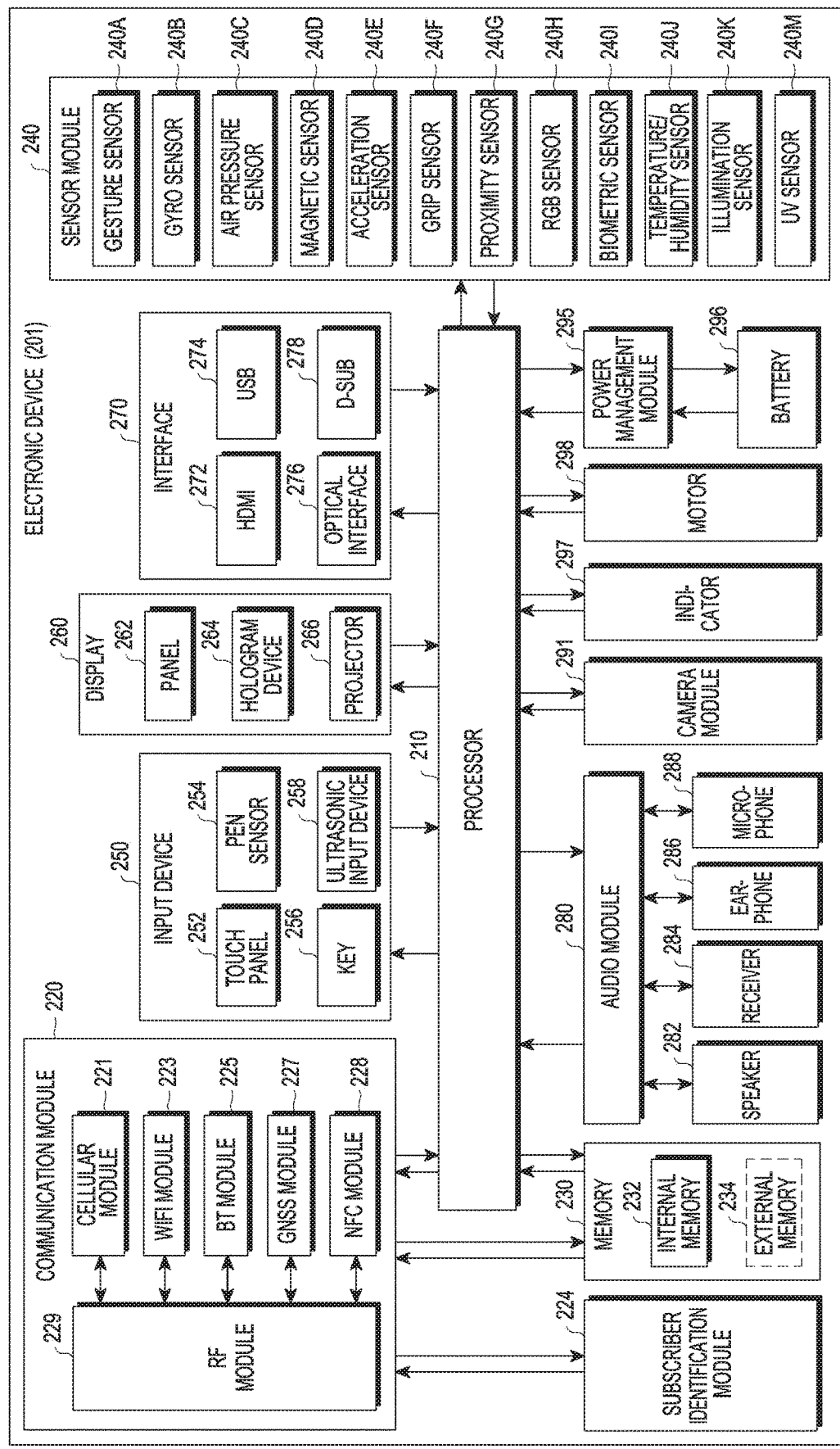
FIG. 2 is a block diagram illustrating an electronic device according to various embodiments.

FIG. 2 is a block diagram illustrating an electronic device 201 according to various embodiments. The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment, the cellular module 221 may perform at least some of the functions providable by the processor 210. According to an embodiment, the cellular module 221 may include a communication processor (CP). According to an embodiment, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to another embodiment, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. For example, the internal memory 232 may include at least one of a volatile memory (e.g., a dynamic RAM (DRAM), a static RANI (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an ultraviolet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment, the electronic device 201 may further include a processor configured to control the sensor module 240 as part of the processor 210 or separately from the processor 210 and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or keypad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment, the panel 262 may include a pressure sensor (or force sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment, one or more image sensors (e.g., front and back sensors), a lens, an image signal processor (ISP), or a flash such as an LED or xenon lamp. The power manager module 295 may manage power of the electronic device 201, for example. According to an embodiment, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
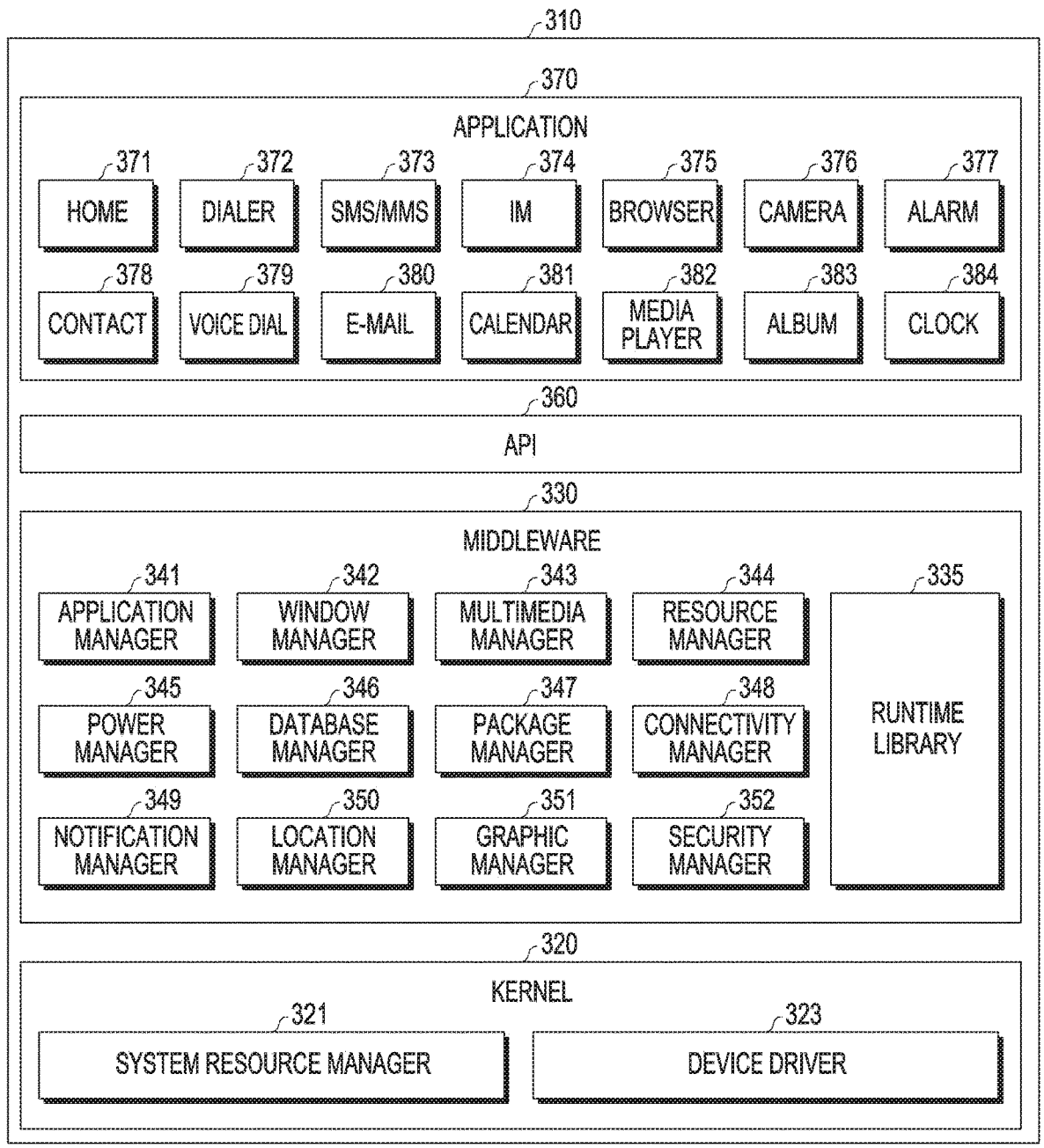
FIG. 3 is a block diagram illustrating a program module according to various embodiments.

FIG. 3 is a block diagram illustrating a program module according to various embodiments. According to an embodiment, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Bada™ Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341, for example, may manage the life cycle of the application 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and the related user interface. The security manager 352 may provide system security or user authentication, for example. According to an embodiment, the middleware 330 may include a telephony manager for managing the voice or video call function of the electronic device or a middleware module able to form a combination of the functions of the above-described elements. According to an embodiment, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, health-care (e.g., measuring the degree of workout or blood sugar), or provision of environmental information (e.g., provision of air pressure, moisture, or temperature information). According to an embodiment, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment, the application 370 may include an application (e.g., a health-care application of a mobile medical device) designated according to an attribute of the external electronic device. According to an embodiment, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., compact disc-read only memory (CD-ROM)), digital versatile disc (DVD), magnetic-optical medium (e.g., floptical disk), or an embedded memory. The instruction may include a code created by a compiler or a code executable by an interpreter. Modules or programming modules in accordance with various embodiments may include at least one or more of the aforementioned components, omit some of them, or further include other additional components. Operations performed by modules, programming modules or other components in accordance with various embodiments may be carried out sequentially, in parallel, repeatedly or heuristically, or at least some operations may be executed in a different order or omitted or other operations may be added.

FIG. 4A is a view illustrating example biometric sensors of an electronic device according to various embodiments. FIG. 4B is a view illustrating an example biometric sensor of an electronic device according to various embodiments. FIG. 4C is a view illustrating an example biometric sensor of an electronic device according to various embodiments.

FIGS. 4A, 4B, and 4C show an example electronic device (e.g., 100 of FIG. 1) according to various embodiments. Referring to FIG. 4A, the electronic device 400 may include a biometric sensor 420 (e.g., a fingerprint sensor) for recognizing biometric information (e.g., fingerprint information) in at least a portion of the display 410. As the biometric sensor 420 is formed in at least a portion (e.g., the active area or black matrix (BM) area of the display) of the display 410, the biometric sensor 420 may obtain the user's biometric information using a user input to the display 410. Referring to FIG. 4B, the electronic device may include a biometric sensor 450 disposed to overlap at least a portion of the display 440. In the electronic device, the area the biometric sensor 450 takes up is disposed without a separate physical button and to overlap at least a portion of the display 440 so that the display of the electronic device may be enlarged. Referring to FIG. 4C, according to various embodiments, the biometric sensor 460 is not limited as disposed to overlap at least a portion of the display 410 but may rather be positioned on a side surface or bottom of the electronic device 400.

Figure 5:
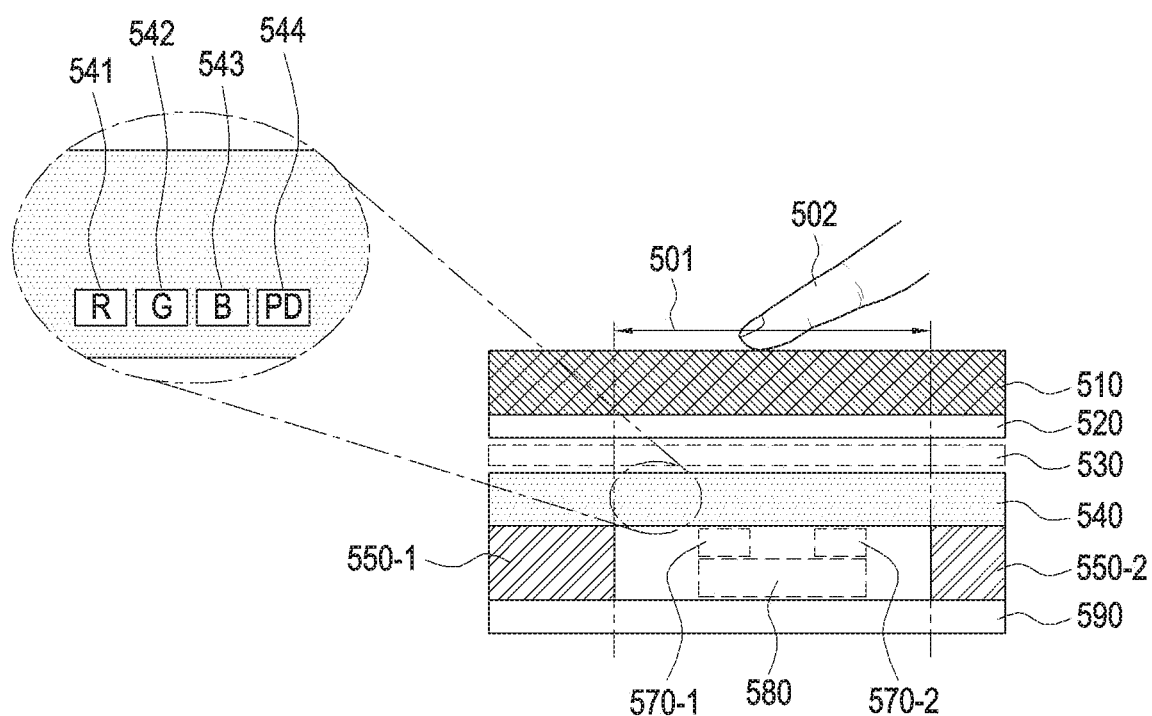
FIG. 5 is a view illustrating a method for detecting a touch input using a variation in capacitance by an electronic device according to various embodiments.

FIG. 5 is a view illustrating an example structure in which an electronic device has a biometric sensor according to various embodiments.

FIG. 5 shows an example mounting structure in which a biometric sensor (e.g., the biometric sensor 420 of FIG. 4A) for sensing a user's biometric information is mounted on at least a portion of a display 540 of an electronic device (e.g., the electronic device 100 of FIG. 1) according to various embodiments. According to an embodiment, the electronic device may include glass 510, a fingerprint sensor 530, a display 540, a fingerprint sensor 580, or a PCB 590. The glass 510 may be attached to the fingerprint sensor 530 or display 540 by an adhesive 520. According to an embodiment, the electronic device may further include structures 550-1 and 550-2 to secure a mounting space for the biometric sensor 580. At this time, the structures 550-1 and 550-2 may form at least part of a sealing structure for protecting the fingerprint sensor 580.

According to various embodiments, the biometric sensors 530 and 580 may be formed in some area (e.g., one or more areas) of the display 540 or the entire area (e.g., the active area of the display) of the display. The biometric sensor 530 or 544 capable of sensing biometric information may be formed on one surface (e.g., top surface) of the display (e.g., a separate layer on one surface of the display or at least a portion of the area where pixels 541 to 543 of the display are formed). According to an embodiment, the biometric sensor 580 may be formed on another surface (e.g., the opposite surface) of the display. The biometric sensor 530, 544, or 580 may include, e.g., an optical image sensor, an ultrasonic transmitting/receiving module, or a capacitive transmitting/receiving electrode pattern.

According to various embodiments, the biometric sensor 530 may be formed between the adhesive layer 520 and the display 540 or between the window glass 510 and the adhesive layer 520. The biometric sensor 530 may be formed of a capacitive transmitting/receiving electrode pattern and may be formed of a transparent electrode to raise the transmittance of light emitted from the display 540. According to an embodiment, the biometric sensor 530 may also include an ultrasonic transmitting/receiving module.

According to various embodiments, the electronic device may include the biometric sensor 580 on another surface of the display. Elastomers 570-1 and 570-2 (e.g., sponge or rubber) may be formed between the display 540 and the biometric sensor 580 to mitigate impacts between the biometric sensor 580 and the display 540 or prevent influx of a foreign body. According to various embodiments, the biometric sensor 580 may include an image sensor. For example, the image sensor may output light (e.g., visible light, infrared, or ultraviolet light) emitted from a light source (e.g., the display 540 or an IR LED) to the user's fingerprint and detect the light reflected by the user's fingerprint.

Figure 6:
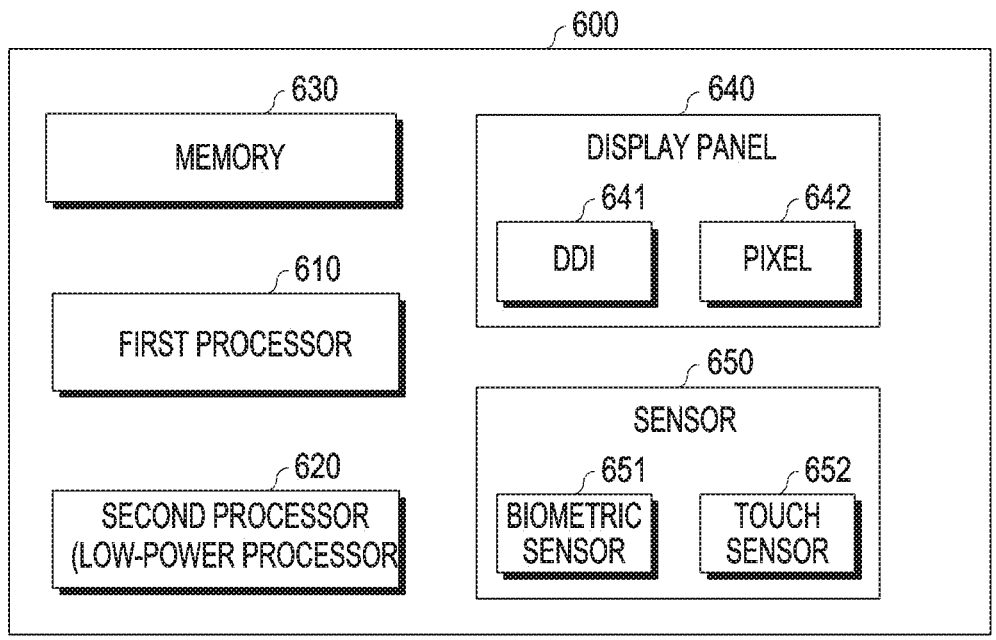
FIG. 6 is a view illustrating an example electronic device according to various embodiments.

FIG. 6 is a view illustrating an example electronic device according to various embodiments.

FIG. 6 shows an example electronic device according to various embodiments. According to an embodiment, the electronic device may include at least one processor (e.g., a first processor 610 or a second processor 620), a memory 630, a display 640, or at least one sensor 650. According to an embodiment, the first processor 610 may control the overall operation of the electronic device. Where the second processor 620 (e.g., a low-power processor or sensor hub), when the electronic device is in a sleep mode, may process inputs obtained from the user or sensor information obtained through the at least one sensor 650 without waking up the first processor 610. According to an embodiment, the second processor 620 may control the biometric sensor 651, the touch sensor 652, or the display panel 640 independently from the first processor 610.

According to various embodiments, the electronic device may include a memory 630. The memory 630 may include a normal area for storing, e.g., user applications, or a security area for storing information sensitive to security, e.g., information for sensing fingerprints. According to an embodiment, the display module 640 may include a display panel 642 including a plurality of pixels and a display driving module 641 (e.g., a display driver integrated circuit (DDI)) configured to control at least some of the plurality of pixels in the display panel 642 to provide display information. According to various embodiments, the sensor 650 may include a biometric sensor 651 (e.g., a fingerprint sensor) for sensing the user's fingerprint on the display module 640 or a touch sensor 652 for sensing the user's touch on the display module 640. According to an embodiment, the biometric sensor 651 may detect the user's biometric information through various schemes, such as an optical fingerprint sensor (e.g., an image sensor) adopting light outputted from the display module as a light source as well as a capacitive fingerprint sensor or an ultrasonic wave fingerprint sensor.

According to various embodiments, the at least one sensor 650 may drive the plurality of pixels in the display panel 642 through the display driving module 641 in response to a user input. According to an embodiment, the at least one sensor 650 may control the display panel 642 as necessary. For example, the biometric sensor 651 may control the display panel 642 and use light emitted from the display so as to obtain the user's biometric information.

Figure 7:
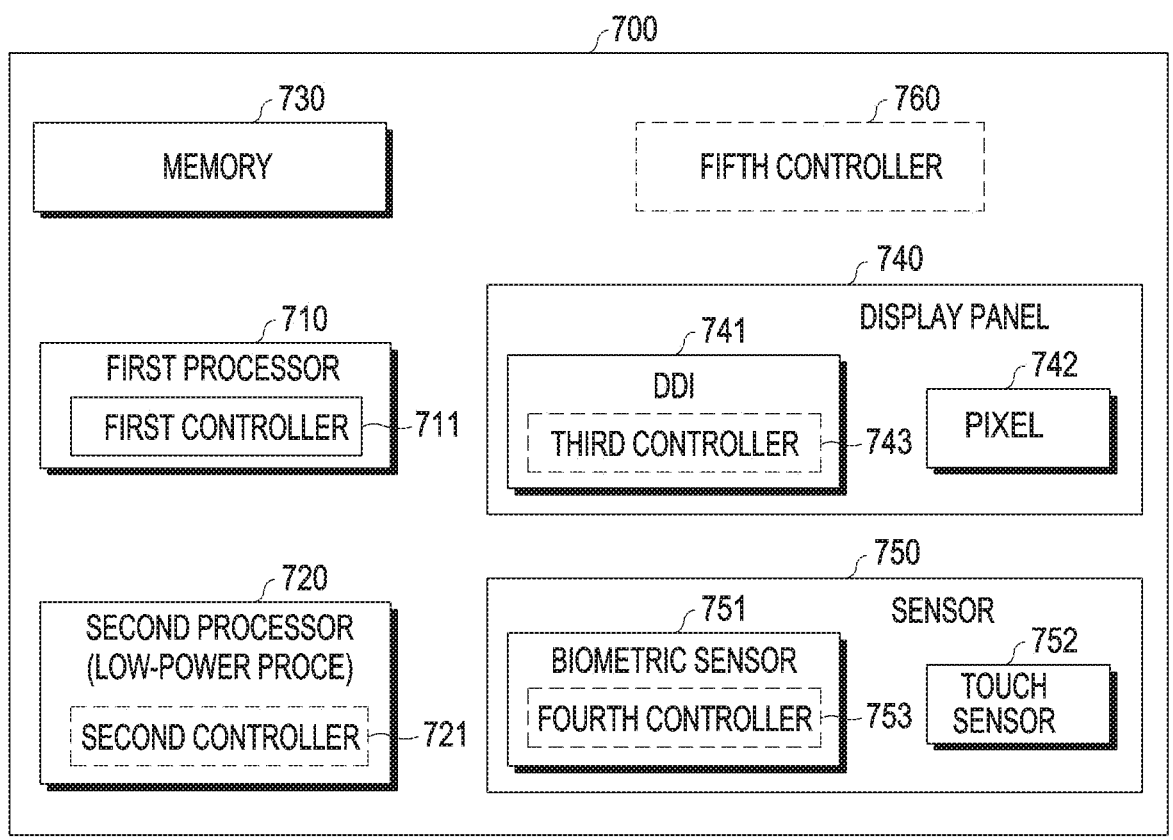
FIG. 7 is a view illustrating an example electronic device according to various embodiments.

FIG. 7 is a view illustrating an example electronic device according to various embodiments.

FIG. 7 shows another example electronic device 700 according to various embodiments. According to an embodiment, the electronic device may include a plurality of controllers (e.g., a first controller 711, a second controller 721, a third controller 743, a fourth controller 753, or a fifth controller 760), and each of the controllers may be included in a module (e.g., the first processor 710, the second processor 720, the DDI 741, or the biometric sensor 751) of the electronic device. For example, the electronic device may control the first processor 710 using the first controller 711 and the second processor 720 using the second controller 721. The electronic device may control the module including the third controller 743 and the fourth controller 753 using the third controller 743 and the fourth controller 753.

According to various embodiments, the modules of the electronic device may be controlled using one controller. For example, the electronic device may control a plurality of controllers (e.g., the first controller 711, the second controller 721, the third controller 743, and the fourth controller 753) using a main controller (e.g., the fifth controller 760). The electronic device may designate the main controller and control the other controllers with the designated main controller. For example, the electronic device may change the main controller from the fifth controller 760 to the first controller 711 or designate the first controller 711 as the main controller, and the electronic device may control the other controllers using the designated main controller.

According to various embodiments, the modules of the electronic device may be directly controlled using one controller. For example, the electronic device may control the second processor 720, the memory 730, the display 740, and/or at least one sensor 750 using the first controller 711 included in the first processor 710. According to another embodiment, the display 740 and at least one sensor 750 may be controlled by one controller. For example, in the case of an optical fingerprint sensor adopting the display 740 as a light source, the display 740 and the sensor 750 may be controlled using one controller, and the user's biometric information may easily be obtained.

Figure 8A:
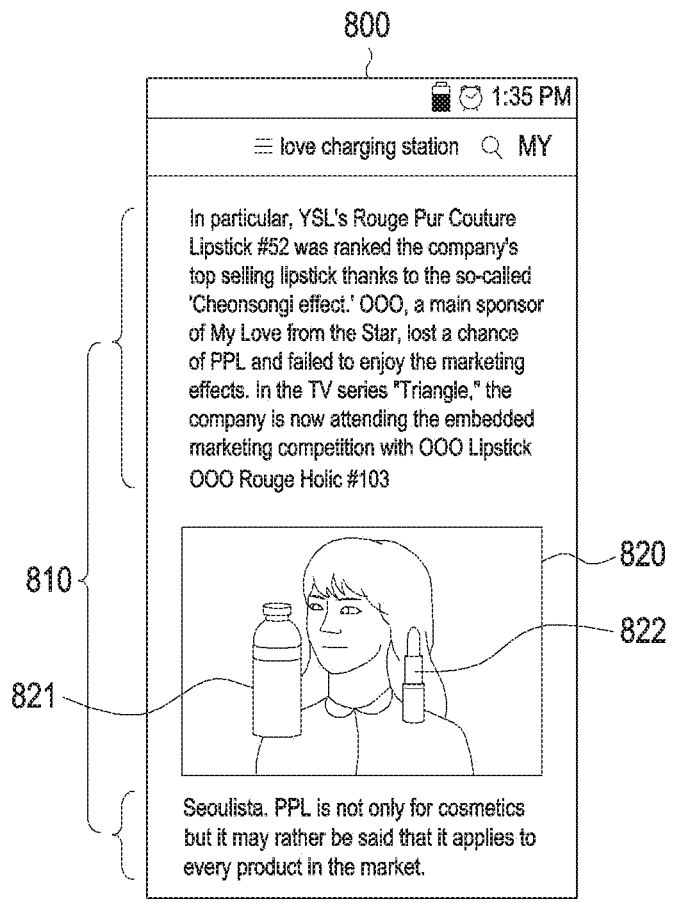
FIG. 8A is a view illustrating an example configuration for providing a payment function for an object displayed on a touchscreen according to various embodiments.
Figure 8B:
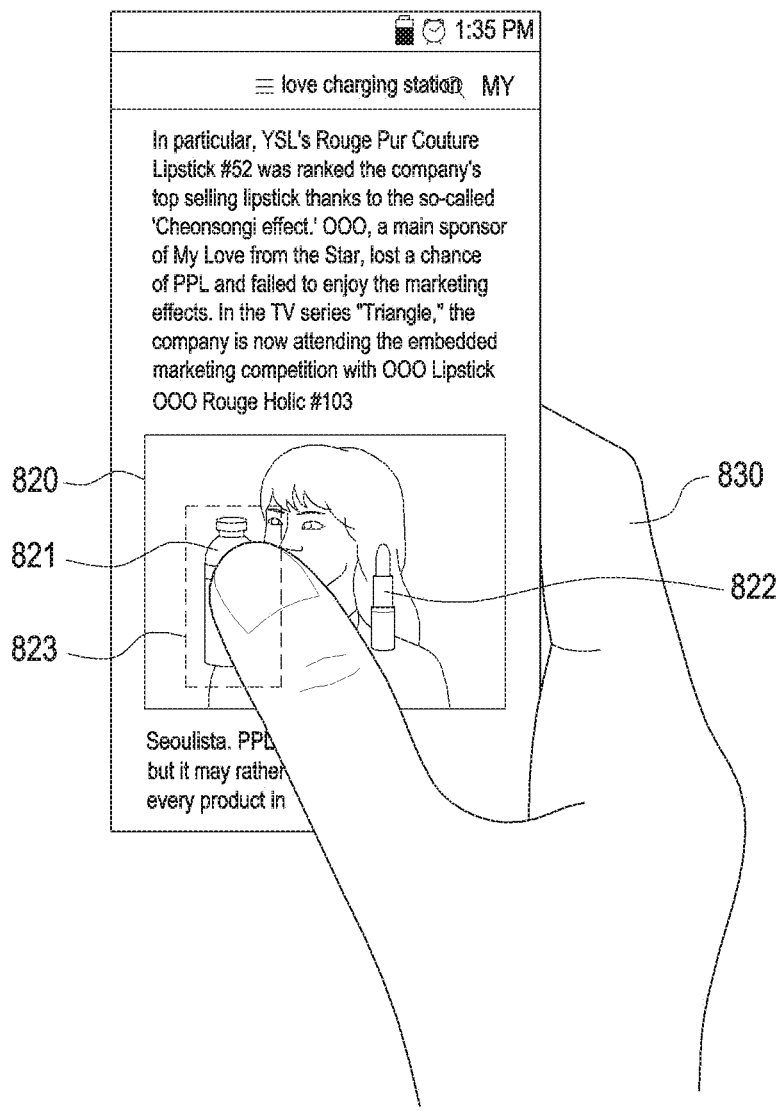
FIG. 8B is a view illustrating an example configuration for providing a payment function for an object displayed on a touchscreen according to various embodiments.
Figure 8C:
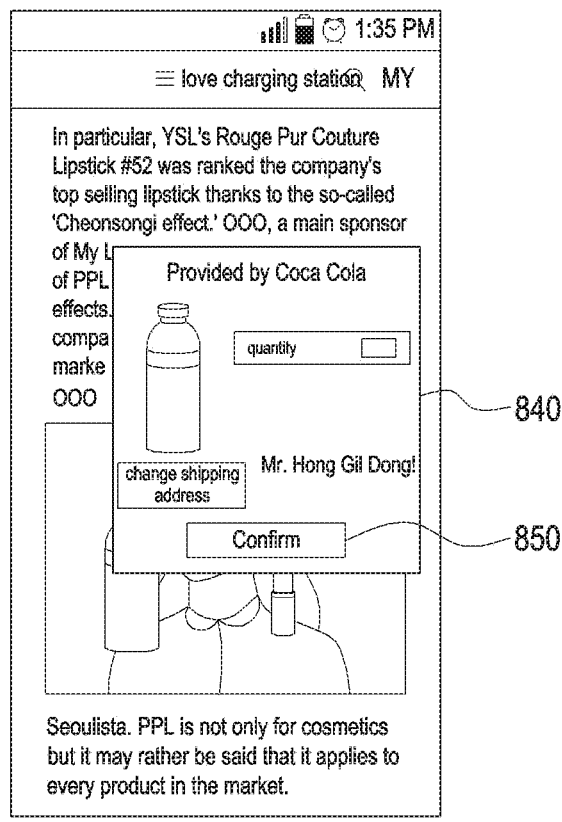
FIG. 8C is a view illustrating an example configuration for providing a payment function for an object displayed on a touchscreen according to various embodiments.
Figure 8D:
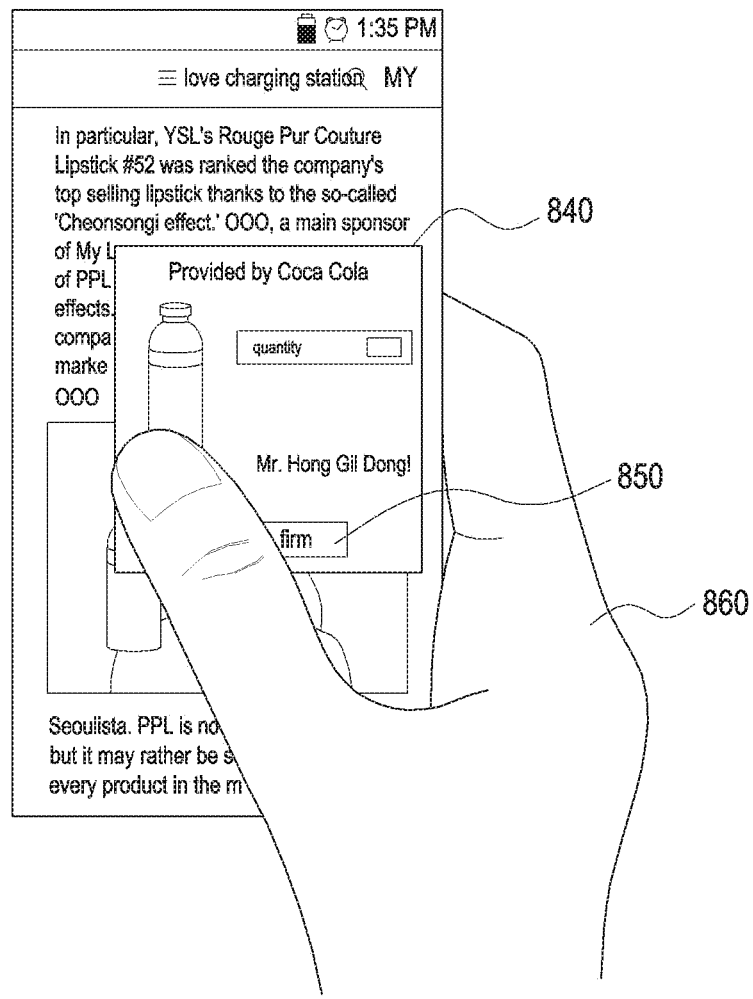
FIG. 8D is a view illustrating an example configuration for providing a payment function for an object displayed on a touchscreen according to various embodiments.
Figure 8E:
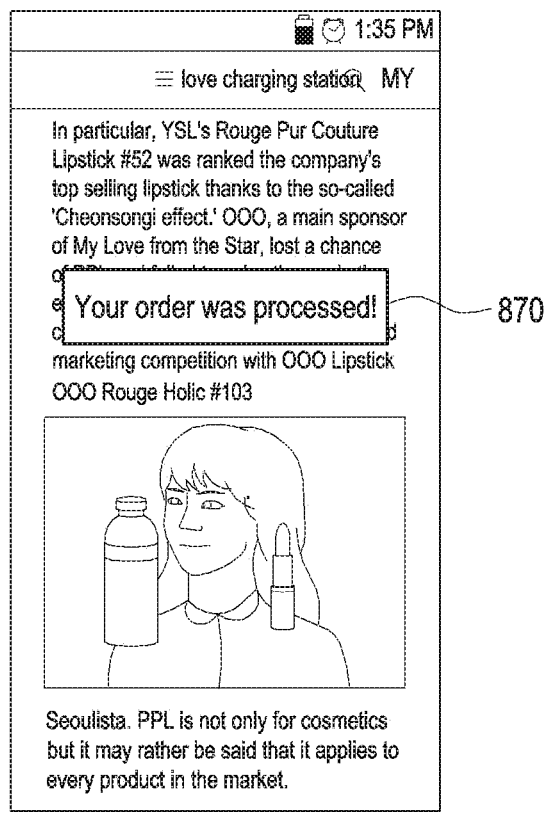
FIG. 8E is a view illustrating an example configuration for providing a payment function for an object displayed on a touchscreen according to various embodiments.
Figure 8F:
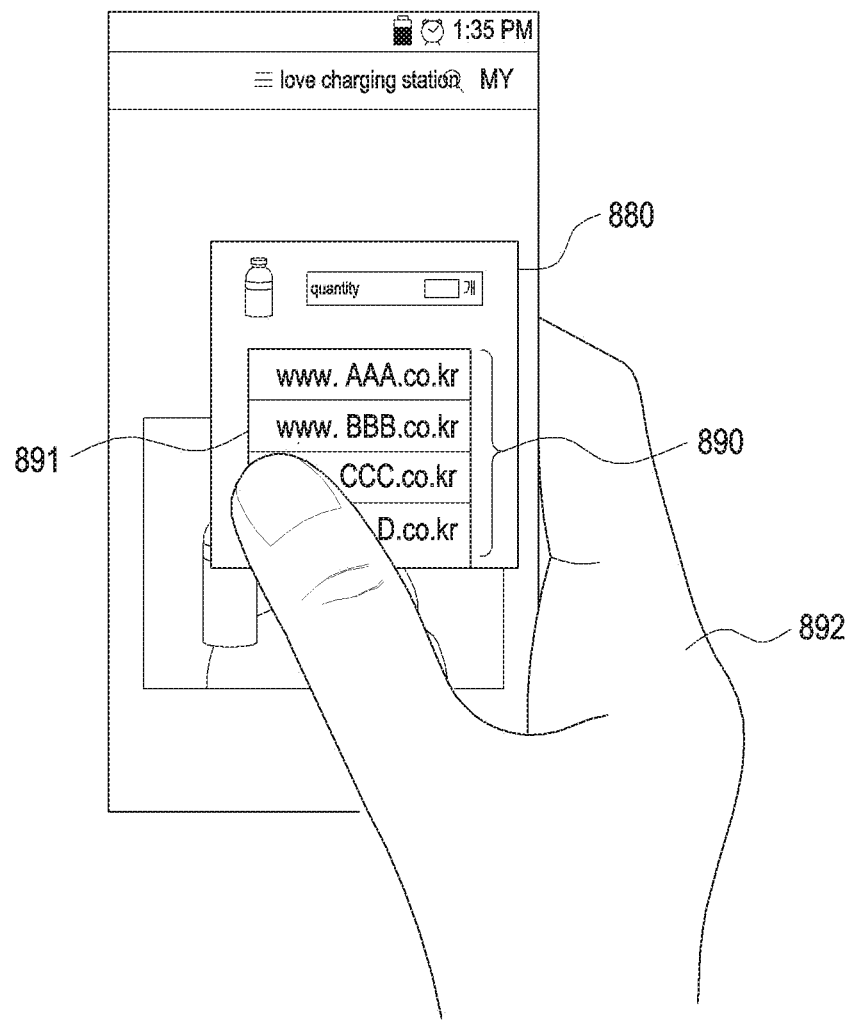
FIG. 8F is a view illustrating an example configuration for providing a payment function for an object displayed on a touchscreen according to various embodiments.

FIG. 8A is a view illustrating an example configuration of providing a payment function for an object displayed on a touchscreen according to various embodiments. FIG. 8B is a view illustrating an example configuration for providing a payment function for an object displayed on a touchscreen according to various embodiments. FIG. 8C is a view illustrating an example configuration for providing a payment function for an object displayed on a touchscreen according to various embodiments. FIG. 8D is a view illustrating an example configuration for providing a payment function for an object displayed on a touchscreen according to various embodiments. FIG. 8E is a view illustrating an example configuration for providing a payment function for an object displayed on a touchscreen according to various embodiments. FIG. 8F is a view illustrating an example configuration for providing a payment function for an object displayed on a touchscreen according to various embodiments.

According to various embodiments, a processor (e.g., the processor 120 of FIG. 1) of an electronic device may perform payment for an object displayed on a webpage while a web browser application program is running. According to an embodiment, to pay for the object displayed on the webpage, the user may perform payment for the product associated with the object present in the webpage currently being used using a two-step operation of press-and-confirm on the electronic device.

Referring to FIG. 8A, the processor (e.g., the processor 120 of FIG. 1) of the electronic device may perform control to display a text 810 or image 820 on the webpage 800 displayed on the touchscreen. The image 820 displayed on the touchscreen may include at least one payable object, e.g., item A 821 and item B 822. Referring to FIG. 8B, if the user 830 makes a touch on the touchscreen to select item A 821 included in the displayed image 820, the processor (e.g., the processor 120 of FIG. 1) may detect the touch. The processor (e.g., the processor 120 of FIG. 1) may obtain the user's biometric information (e.g., fingerprint information) through the user's touch input using the biometric sensor, authenticate the user using the obtained biometric information, and perform payment for the product associated with the selected object. The processor may obtain information about selection of an object included in an image based on the user's touch input and, upon detecting, from the user 830, an additional touch input for inputting the user's biometric information so as to pay for the object, obtain biometric information from the additional touch input.

According to various embodiments, if the touch input of the user 830 is detected, the processor may display information indicating that the object corresponding to the touch input is recognized on the display. Referring to FIG. 8B, upon detecting a touch input of selecting item A 821 from the user 830, the processor may display information indicating that item A 821 is selected on the display. For example, the processor may provide an indication 823 that item A 821 is selected around item A 821 as shown in FIG. 8B. The indication 823 of FIG. 8B is merely an example. The processor may display selection of an object in various manners, such as bordering the object. The present invention is not limited to the example of FIG. 8B. Referring to FIG. 8C, if selection of the object is complete as shown in FIG. 8B, payment information about the product associated with the selected object may be provided through a popup window 840. The popup window 840 may include a "Confirm" button 850. If the user's touch input is applied to the touchscreen, the processor (e.g., the processor 120 of FIG. 1) may recognize the touch input as a payment command and provide a payment function for the product. The payment command may include all operations or inputs which enable recognition of the user's intent for payment after the user's biometric information is obtained. According to an embodiment, the processor may search a website selling the product corresponding to the object using a preset reference and select any one website based on the result of search and the preset reference. According to an embodiment, the processor may display a payment interface for the selected website through the popup window 840. As the preset reference, various references, such as the price of the product corresponding to the object, the user's settings, or the reliability of the website, may be set. According to an embodiment, the processor (e.g., the processor 120 of FIG. 1) may produce a graphical user interface using at least one or more of the payment information about store information and the object registered in the tag information about the object included in the webpage or the tag information set in the webpage and display the graphical user interface on the touchscreen. Referring to FIG. 8D, the user 860 may perform a payment command to apply a touch input to the "Confirm" button 850 included in the popup window 840 through, e.g., a touch input and, if the electronic device receives and recognizes the payment command, perform payment for the product related to the object using the obtained biometric information. Referring to FIG. 8E, if payment for the product is complete, a notification 870 that payment has been complete may be provided to the user in the form of, e.g., a popup window.

According to various embodiments, it is possible to perform a payment function for a product corresponding to an object using only biometric information even without a separate payment command. According to an embodiment, a processor (e.g., the processor 120 of FIG. 1) may be configured to perform control to display an image including at least one object on the touchscreen, detect a touch to a first object among the at least one object through the touchscreen, and perform a payment function for a product corresponding to the first object using biometric information that the biometric sensor obtains from the touch.

According to another embodiment, the electronic device may analyze a text 810 included in a webpage 800 which is in use by the user, thereby specifying the product that the user intends to buy. According to an embodiment, the processor (e.g., the processor 120 of FIG. 1) of the electronic device may track the movement of the user's pupils through a front camera, detect a specific area of the webpage 800 at which the user gazed with interest before selecting an object, and specify the product that the user intends to buy based on information in the detected area and provide it to the user.

According to various embodiments, there may be provided a plurality of websites where the product corresponding to the object may be purchased, and upon receiving the user's selection, a payment interface for the corresponding website may be displayed.

Referring to FIG. 8F, according to various embodiments, in a case where the processor recognizes a touch input to item A 821 as shown in FIG. 8B, the processor may search websites selling the product corresponding to the object based on a preset reference. The processor may display a plurality of websites 890 according to the result of search unlike in FIG. 8C and receive the user's touch input to any one of the plurality of websites displayed. According to an embodiment, the processor may display a payment interface for the website selected using the user's touch input in a popup window 880. As the preset reference based on which the processor searches and displays the websites, various references, such as the price of the product corresponding to the object, the user's settings, or the reliability of the website, may be set.

Figure 9A:
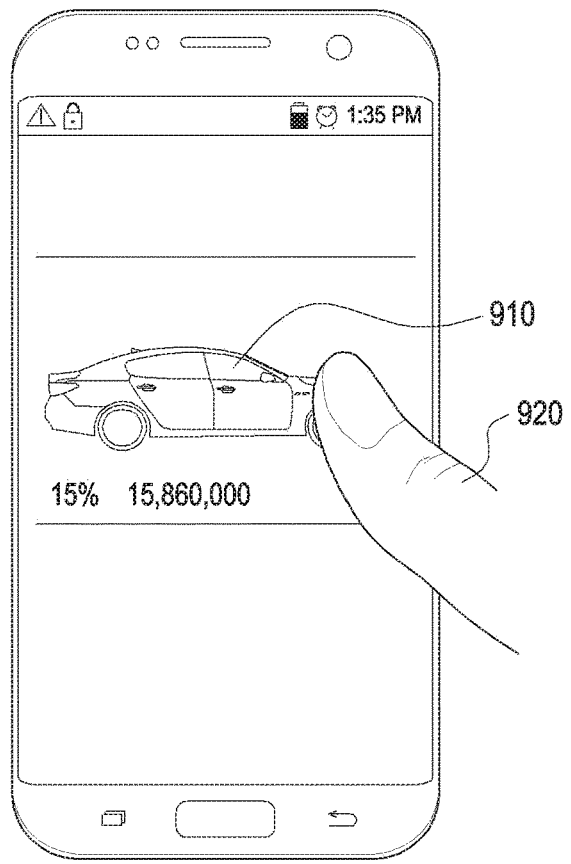
FIG. 9A is an example view for describing a payment command according to various embodiments.
Figure 9B:
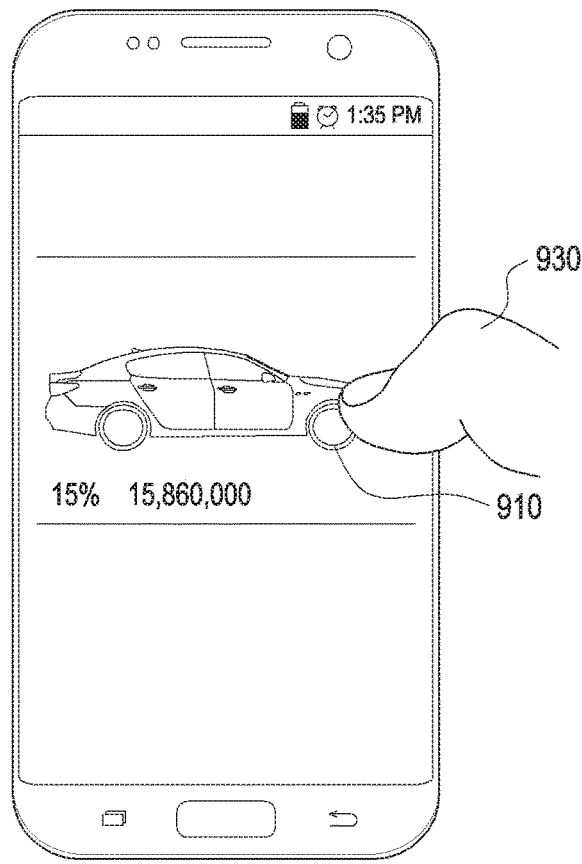
FIG. 9B is an example view for describing a payment command according to various embodiments.

FIG. 9A is an example view for describing a payment command according to various embodiments. FIG. 9B is an example view for describing a payment command according to various embodiments.

According to various embodiments, a processor (e.g., the processor 120 of FIG. 1) of an electronic device may recognize the above-described payment command in other various ways than by the user's touch input. For example, the electronic device may sense a particular motion entered along with authentication of the user's biometric information as a payment command to thereby detect the user's payment intent and proceed with payment for the object therethrough.

Referring to FIG. 9A, if the user 920 selects an object 910 through a touch input, the processor (e.g., the processor 120 of FIG. 1) may obtain the user's biometric information (e.g., fingerprint information) from the user's touch input using a biometric sensor. Referring to FIG. 9B, after sensing the touch input from the user and performing authentication on the biometric information and if a touch input to the object 910 is received which is made by the user 930 using his or her thumb nail tip, the electronic device may recognize it as the user's payment command and provide a payment function for the product associated with the selected object.

Figure 10A:
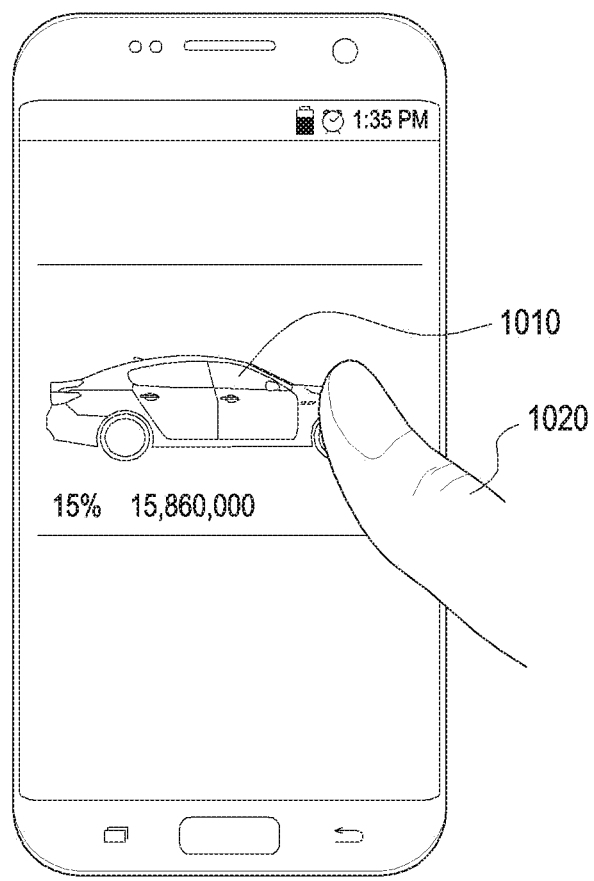
FIG. 10A is an example view for describing a payment command according to other embodiments.
Figure 10B:
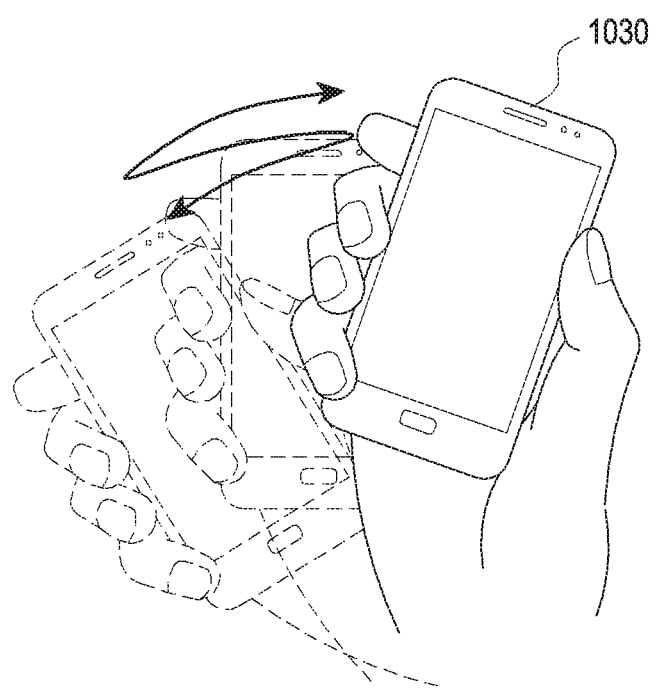
FIG. 10B is an example view for describing a payment command according to other embodiments.

FIG. 10A is an example view for describing a payment command according to other embodiments. FIG. 10B is an example view for describing a payment command according to other embodiments.

According to various embodiments, the electronic device may include at least one sensor. Upon determining that the electronic device is moved in a predetermined motion pattern through the at least one sensor, the electronic device may determine that the motion pattern of the electronic device is the payment command. In the example of FIG. 10A, if the user 1020 applies an input to an object 1010 to buy a product related to the object 1010, the processor (e.g., the processor 120 of FIG. 1) may obtain biometric information, e.g., fingerprint information, from the input of the user 1020. The processor (e.g., the processor 120 of FIG. 1) may obtain fingerprint information and recognize a predetermined motion pattern of the electronic device 1030, which is made by the user, e.g., the motion of shaking the electronic device several times, thereby recognizing the predetermined motion pattern as a payment command for the product associated with the object and providing a payment function for the product.

Figure 11A:
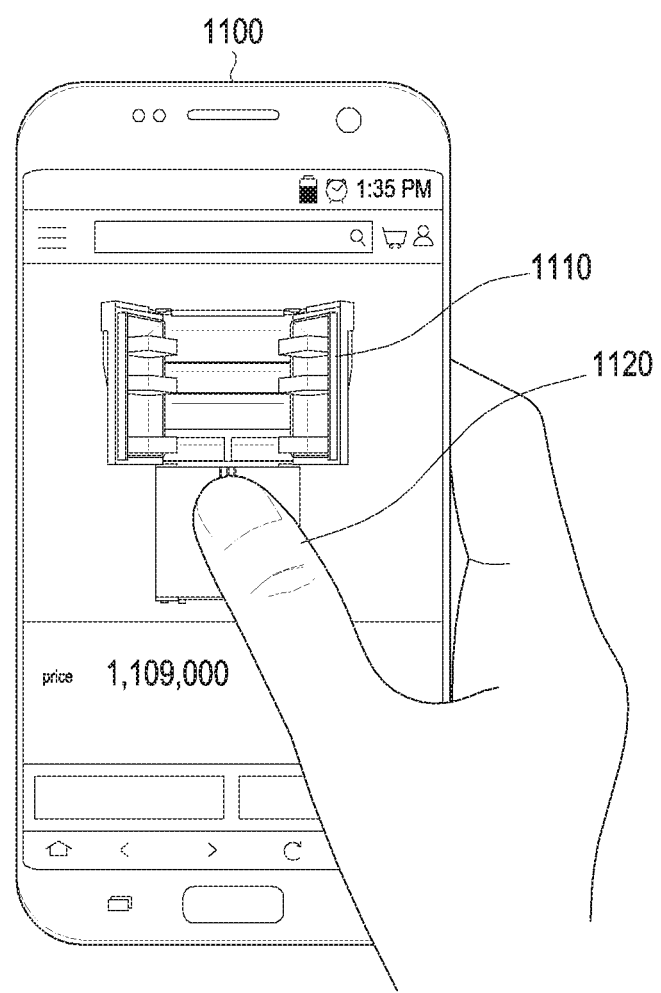
FIGS. 11A, 11B, and 11C are example views for describing a payment command according to other embodiments.
Figure 11B:
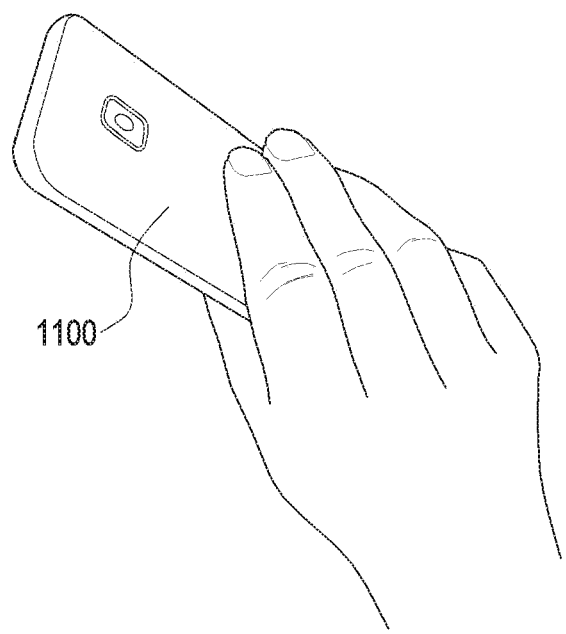
Figure 11C:
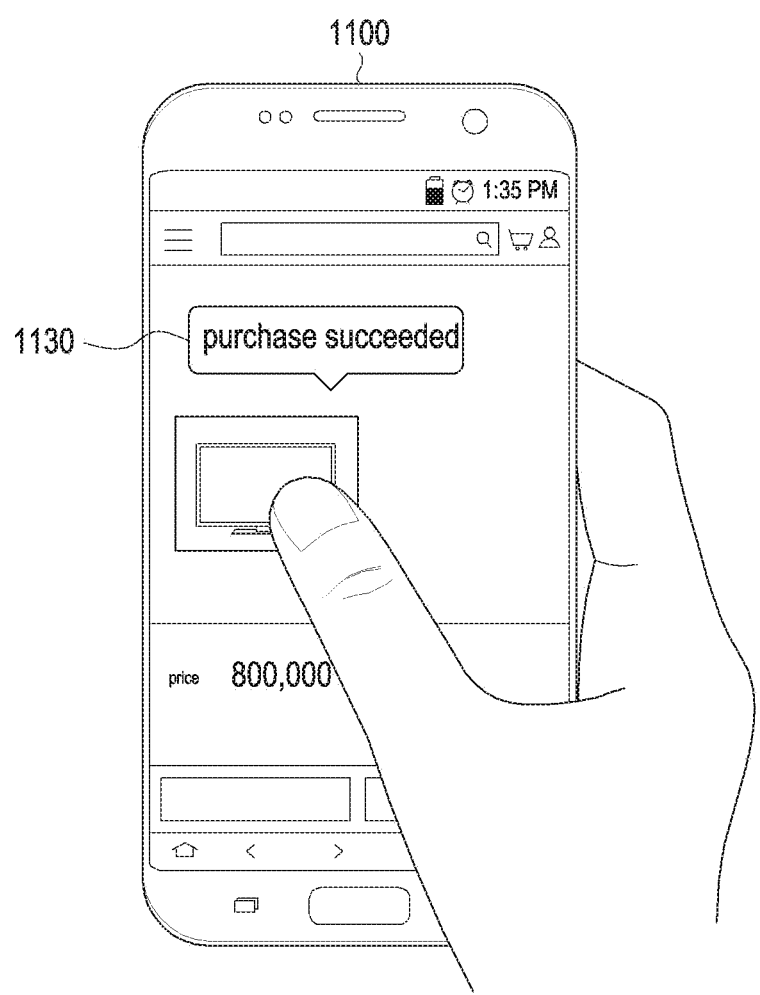

FIGS. 11A, 11B, and 11C are example views for describing a payment command according to other embodiments.

According to various embodiments, the electronic device may recognize the electronic device's predetermined motion pattern (e.g., flip and flip-back with the fingerprint scanned) of the electronic device recognized through the sensor, thereby identifying the user's intent for payment and performing payment for the product. For example, referring to FIG. 11A, in a case where the user 1120 applies an input to the object 1110 displayed on the touchscreen of the electronic device while gripping the electronic device 1100, the processor (e.g., the processor 120 of FIG. 1) may obtain biometric information, e.g., fingerprint information, from the input of the user 1120. At this time, the user may flip and flip back the electronic device as shown in FIG. 11B, with the first processor scanned by the electronic device. The flip-and-flip back action of the electronic device may be stored, as the predetermined motion pattern, in the memory, and a payment function for the product related to the object 1110 may be provided using the payment command according to the predetermined motion pattern. According to an embodiment, if payment for the product related to the object 1110 is complete, the processor (e.g., the processor 120 of FIG. 1) may notify the user that payment for the product has been complete using an alarm 1130 displayed through the touchscreen.

Figure 12:
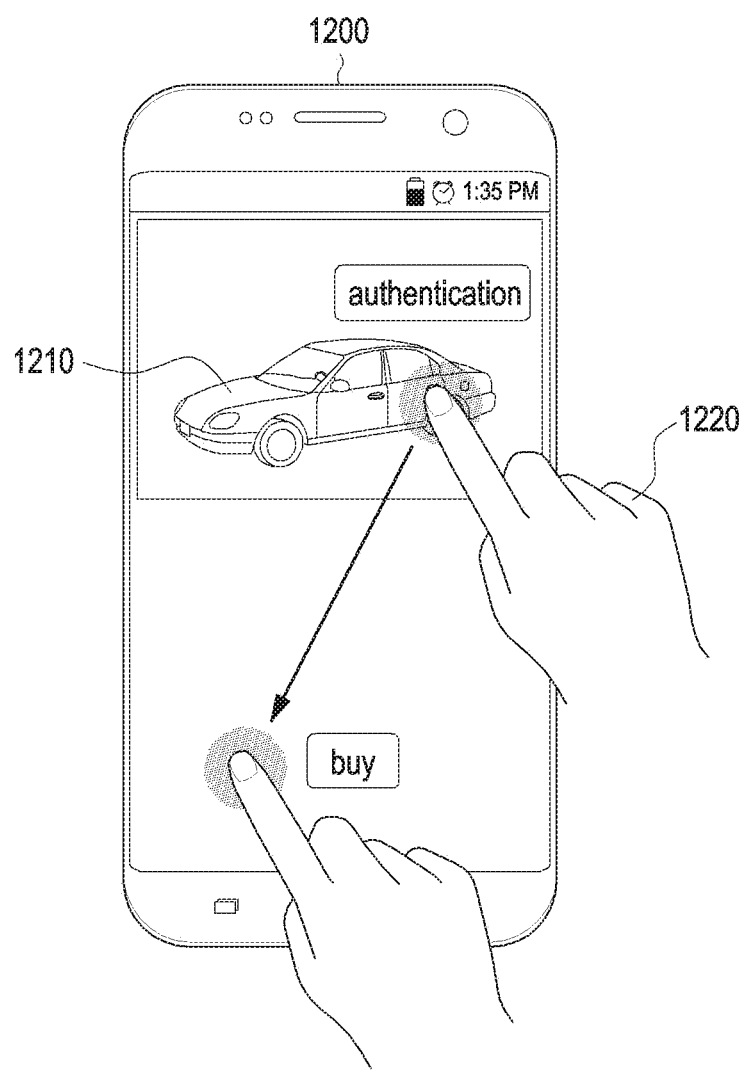
FIG. 12 is an example view for describing a payment command according to other embodiments.

FIG. 12 is an example view for describing a payment command according to other embodiments.

According to various embodiments, an electronic device may receive a fingerprint input from a portion of the electronic device where fingerprint scanning is possible to thereby authenticate the user and then recognize a payment command for the product corresponding to the user's drag. Referring to FIG. 12, in order to pay for a product related to an object 1210 displayed on a touchscreen of an electronic device 1200, the user 1220 may first apply a touch input to an image including the object 1210. According to an embodiment, the processor (e.g., the processor 120 of FIG. 1) may detect a touch to the object 1210 through the touchscreen and may perform a payment function for the product corresponding to the object using the biometric information that the biometric sensor obtains from the touch. According to an embodiment, the processor (e.g., the processor 120 of FIG. 1) may sense a drag input by the user, recognize the sensed drag input as a payment command, and pay for the product related to the object together with the obtained biometric information.

Figure 13A:
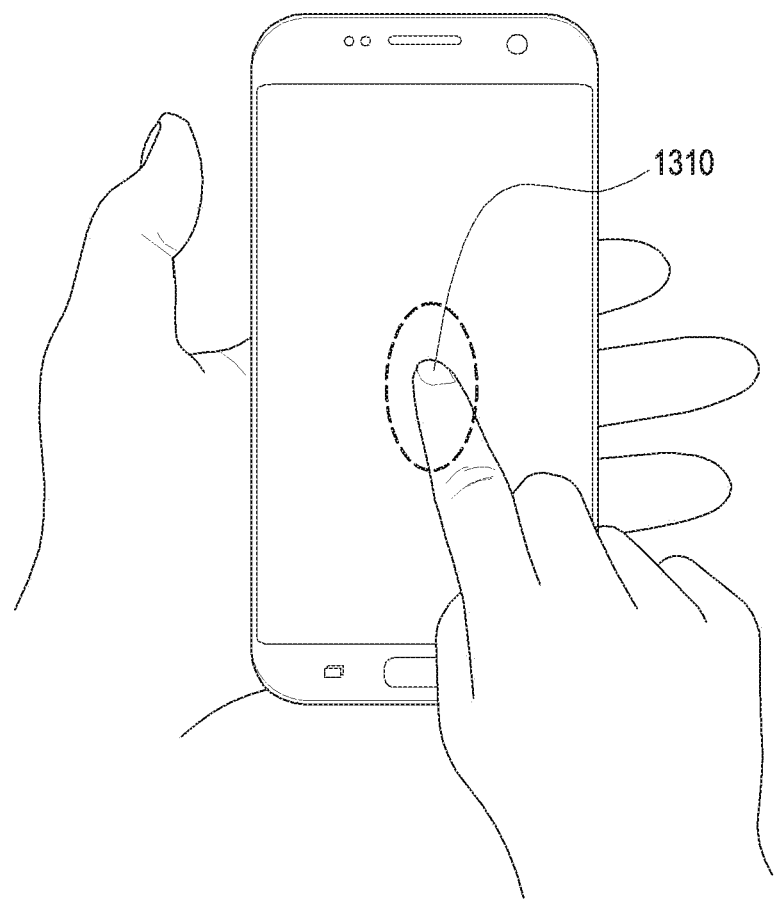
FIG. 13A is an example view for describing a payment command according to other embodiments.
Figure 13B:
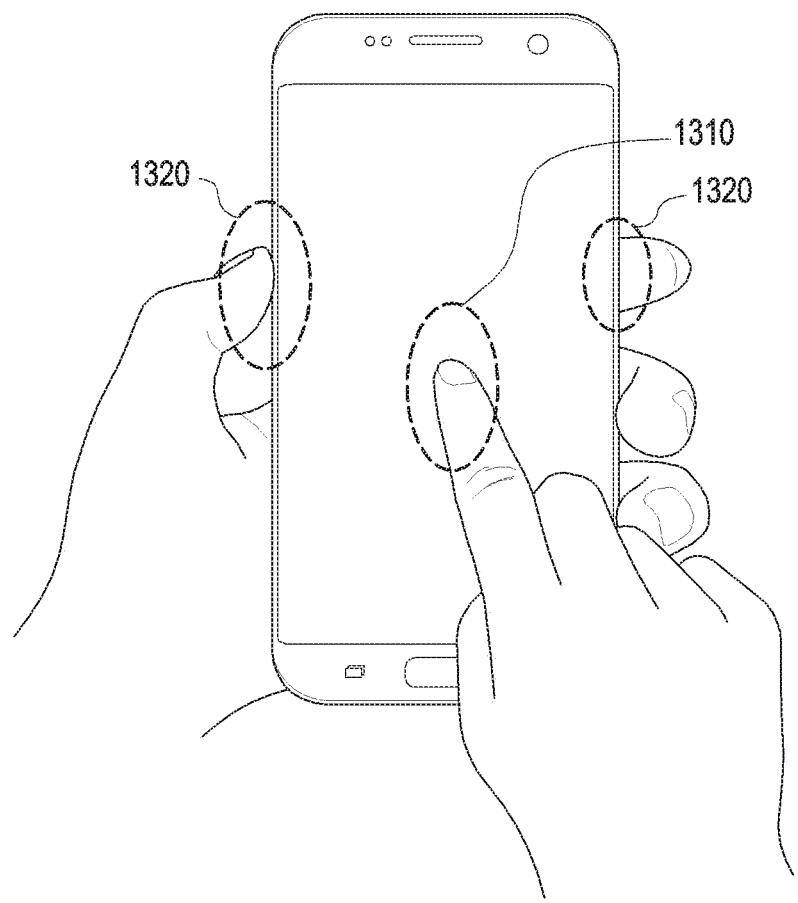
FIG. 13B is an example view for describing a payment command according to other embodiments.

FIG. 13A is an example view for describing a payment command according to other embodiments. FIG. 13B is an example view for describing a payment command according to other embodiments.

According to various embodiments, a processor (e.g., the processor 120 of FIG. 1) of an electronic device may perform control to obtain the user's biometric information using a biometric sensor placed on a side surface of the electronic device. The processor (e.g., the processor 120 of FIG. 1) may perform control to obtain the user's biometric information using only the biometric sensor placed on the front surface as shown in FIG. 13A and may identify selection of a product with the user's touch-specific input pattern (e.g., the operation of inputting a pressure to select the object intended for payment as shown in 1320 of FIG. 13B) for the electronic device as shown in FIG. 13B and then recognize the input 1320 of the biometric sensor to both (or either) side surfaces, thereby identifying the user's intent for payment and performing payment for the product related to the object.

Figure 14A:
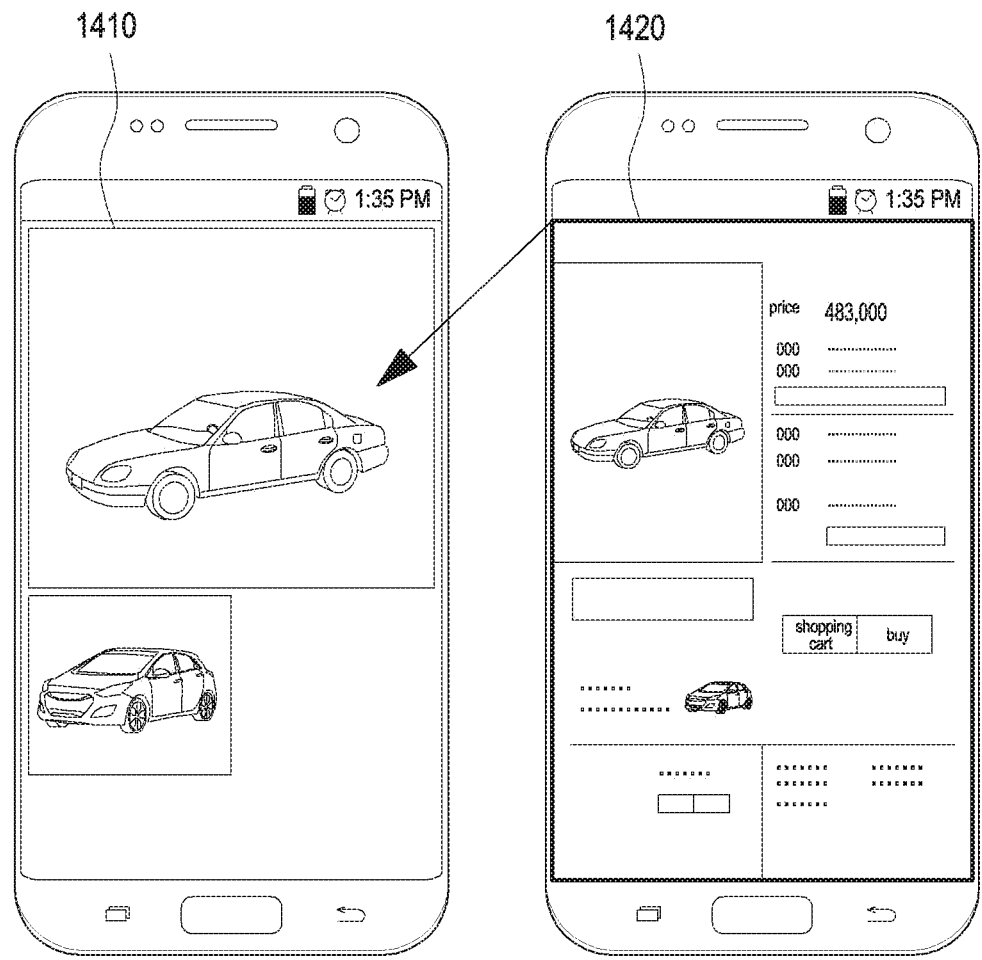
FIG. 14A is a view illustrating an example configuration of providing a link related to an object based on user information and the user's purchase history.
Figure 14B:
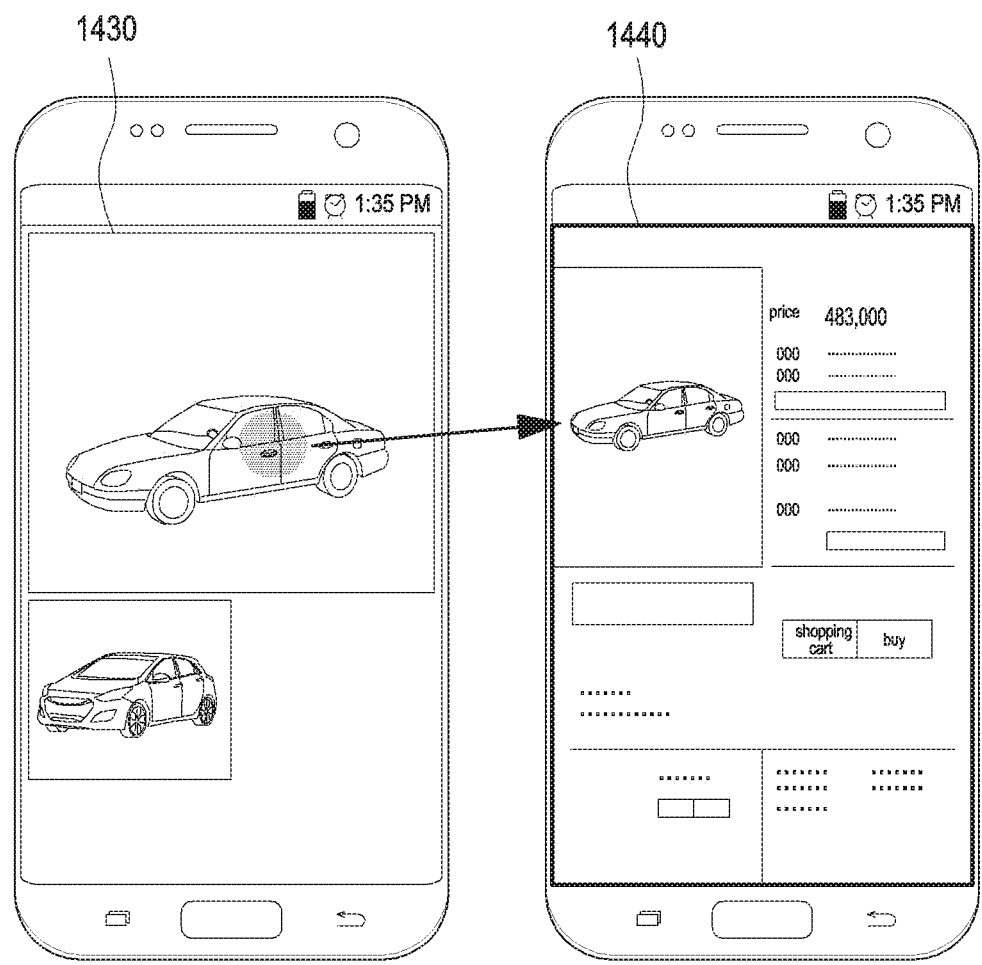
FIG. 14B is a view illustrating an example configuration of providing a link related to an object based on user information and the user's purchase history.

FIG. 14A is a view illustrating an example configuration of providing a link related to an object based on user information and the user's purchase history. FIG. 14B is a view illustrating an example configuration of providing a link related to an object based on user information and the user's purchase history.

According to various embodiments, the electronic device may use the user's prior purchase history or purchase attempt history stored in the internal memory of the electronic device or an external server for the above-described payment. For example, referring to FIG. 14A, the processor (e.g., the processor 120 of FIG. 1) may store history information about the user's purchase or purchase attempt by looking at an image or a particular object in the image. Then, when the user shows his or her intent to purchase the product in the same or similar image or corresponding to a particular object in the same or similar image, the electronic device may select the webpage 1420 from which the particular product may be bought or a purchase method or product information using the particular user's purchase history or purchase attempt history stored and provide it to the user.

According to an embodiment, an external server interworking with the electronic device may gather users' payment histories or payment attempt information transmitted from the electronic device and classify and store the information according to ages, genders, regions, or propensities. Referring to FIG. 14B, in a case where the user indicates a purchase request for the product 1430 corresponding to the particular object on his or her electronic device (e.g., the user's touch input to the object), the server my provide product purchase information according to the particular user's age, gender, region, or propensity to the electronic device and, thus, the electronic device may select a particular product store or purchase method or product information for the user and recommend the user by way of, e.g., a link 1440.

According to various embodiments, the payment scheme by the external server interworking with the electronic device is not limited to internal classifications for payment or payment attempt information. Rather, information for confirming payment may be specified, and information which is registered or created and stored by a number of unspecified users may be used. The product information which a number of unspecified users recorded and stored in various storage devices or in several places on the Internet may be compiled and divided into a purchase record or a purchase attempt record, and one or more may be recommended as compared with the information about the product that the user attempts to purchase. At this time, the user may send the information to the server through evaluation according to the degree of matching his or her intent to purchase and reuse the information in determining the other users' intent to purchase. In a simplified embodiment, a recommendation expected for the user's purchase may be provided by referring to the order of most purchases configured by a number of unspecified persons. However, if it differs from the user's intent to purchase, this may be assessed and the weights for recommendations provided to the other users may be varied. Further, the user's frequency of assessing the degree of matching the intent to purchase may be sent to the server and, based on the information, separate classifications may be made and stored.

Figures 15A, 15B:
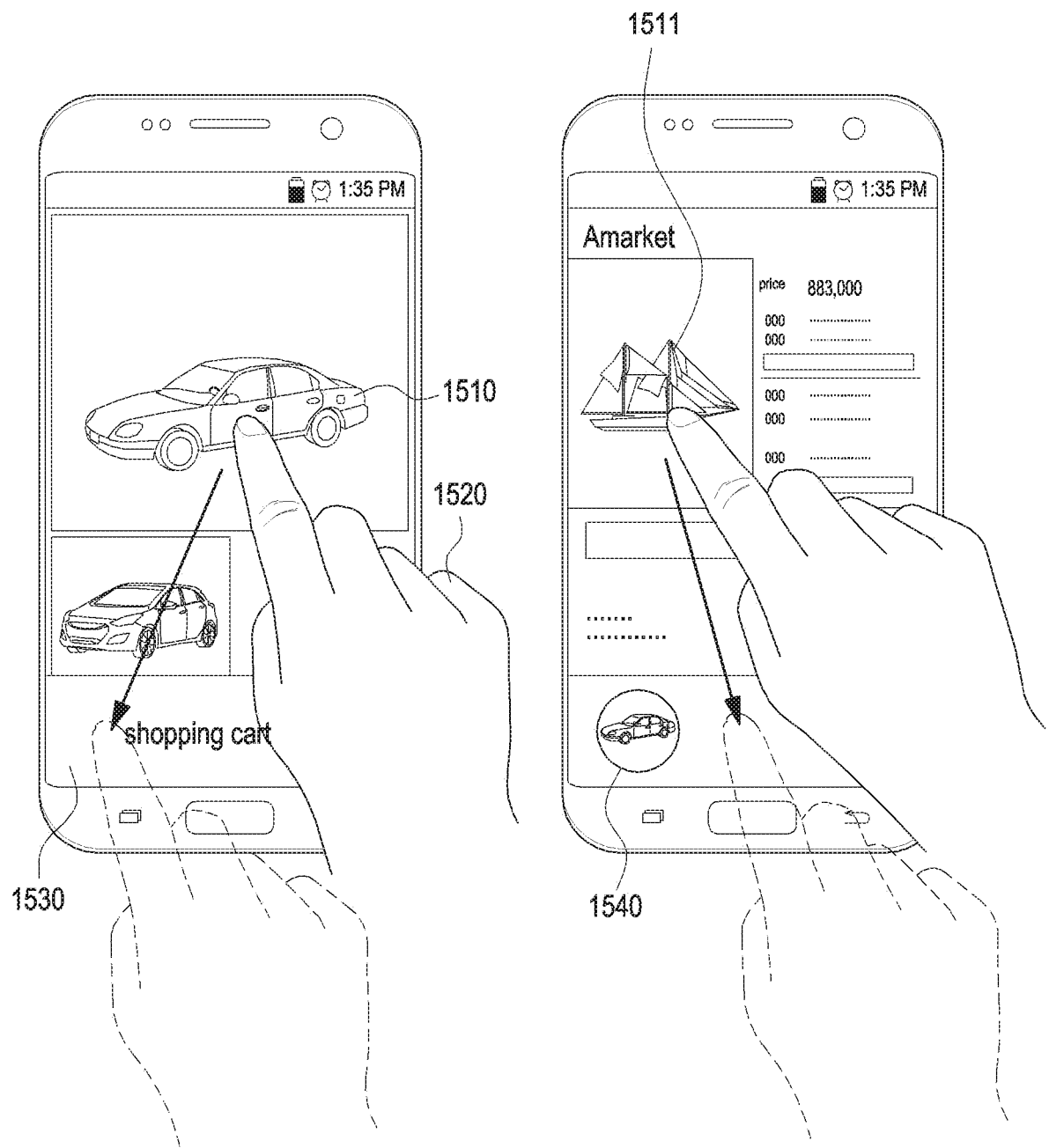
FIG. 15A is an example view for describing a batch payment function according to various embodiments.
FIG. 15B is an example view for describing a batch payment function according to various embodiments.
Figures 15C, 15D:
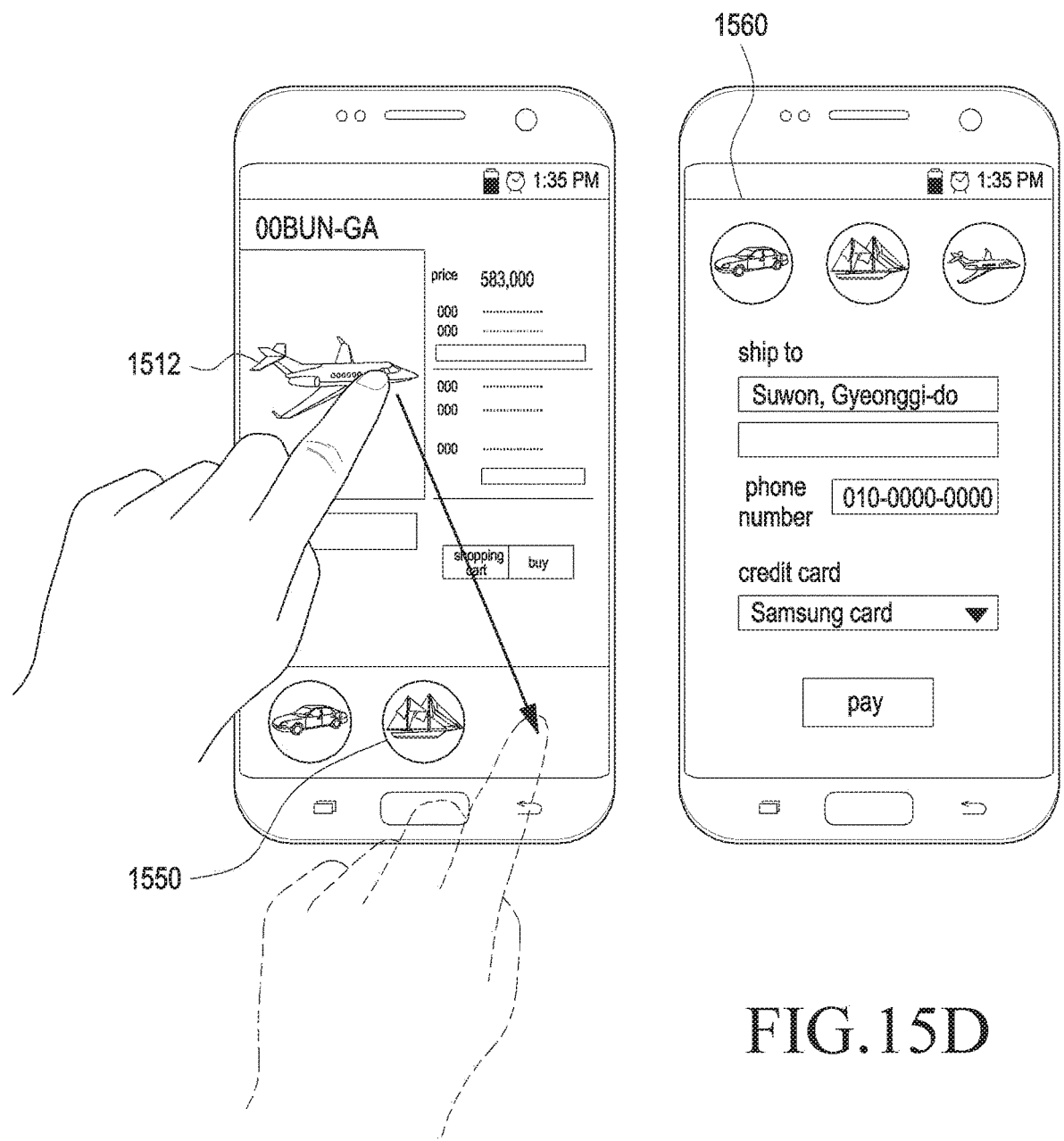
FIG. 15C is an example view for describing a batch payment function according to various embodiments.
FIG. 15D is an example view for describing a batch payment function according to various embodiments.

FIG. 15A is an example view for describing a batch payment function according to various embodiments. FIG. 15B is an example view for describing a batch payment function according to various embodiments. FIG. 15C is an example view for describing a batch payment function according to various embodiments. FIG. 15D is an example view for describing a batch payment function according to various embodiments.

According to various embodiments, the electronic device may store information about products which the user has gathered and perform a batch payment for the products. Referring to FIG. 15A, if an input of a user 1520 is applied to a first object 1510, a processor (e.g., the processor 120 of FIG. 1) may obtain biometric information from the input of the user 1520. According to an embodiment, the user 1520 may drag the object 1510 to a predetermined partial screen area 1530. The processor (e.g., the processor 120 of FIG. 1) may store information about the first object 1510, which has been moved to the predetermined partial screen area 1530, in the memory. Referring to FIG. 15B, a drag to a predetermined partial screen area 1530 may be performed to pay for a second object 1511 other than the first object 1540 stored in the predetermined partial screen area 1530. The second object 1511 may also be stored in the predetermined partial screen area 1530, and the processor (e.g., the processor 120 of FIG. 1) may store information about the second object 1511 in the memory. Referring to FIG. 15C, a third object 1512 may be dragged and stored in a predetermined partial screen area 1530 through the same process, and the processor (e.g., the processor 120 of FIG. 1) may store the relevant information in the memory. According to an embodiment, the processor (e.g., the processor 120 of FIG. 1) may display a payment screen for batch payment for the products related to the first object to the third object as shown in FIG. 15D, corresponding to the user's swipe-up on the predetermined partial screen area 1530 and may pay for the products related to the first object to the third object based on a payment command.

Figure 16:
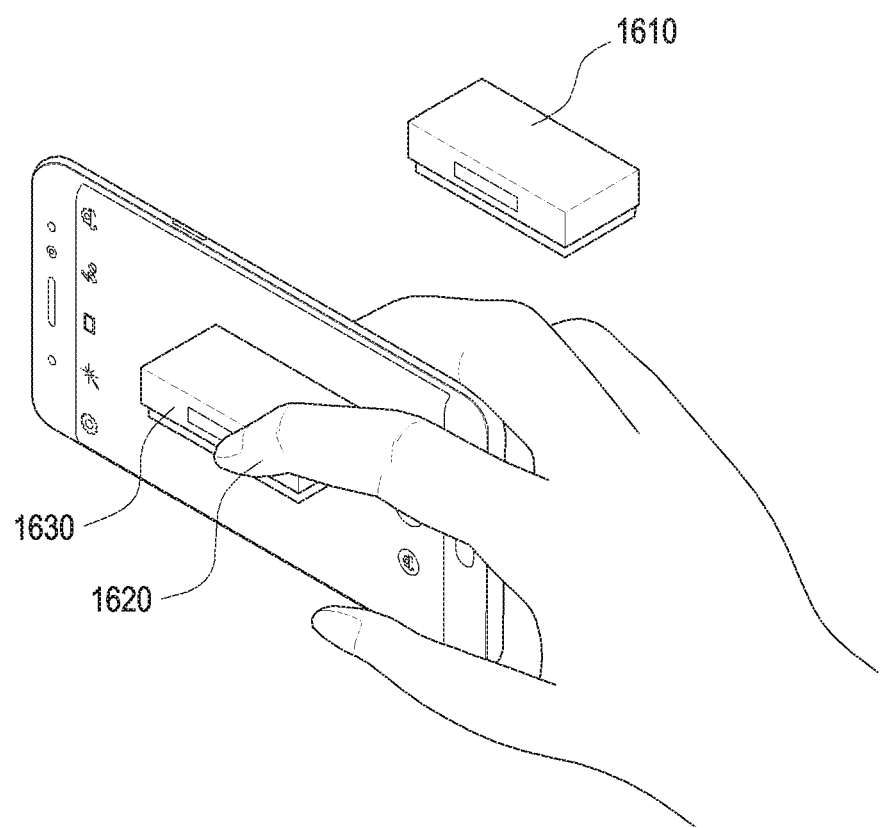
FIG. 16 is a view for describing a payment function by an electronic device according to various embodiments.

FIG. 16 is a view for describing a payment function by an electronic device according to various embodiments.

According to various embodiments, if a camera application runs and at least one object is displayed through the touchscreen, the processor (e.g., the processor 120 of FIG. 1) may recognize the object where an input is received among the at least one object displayed. Referring to FIG. 16, the processor (e.g., the processor 120 of FIG. 1) may capture a product 1610 related to the object using the camera, with the camera application running. If the object 1630 is captured and displayed through the touchscreen, the user 1620 may apply an input for payment for the product 1610 related to the object 1630. The subsequent steps proceed in the same manner as the above-described process. If payment information related to the product 1610 is displayed by the processor (e.g., the processor 120 of FIG. 1), a payment command is received from the user, and the processor (e.g., the processor 120 of FIG. 1) recognizes the payment command, a payment function for the product may be provided.

Figure 17A:
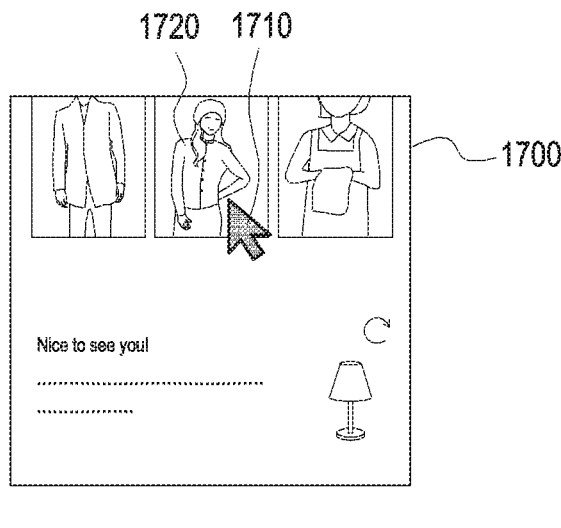
FIG. 17A is a view illustrating an example device of inputting a user's biometric information according to various embodiments.
Figure 17B:
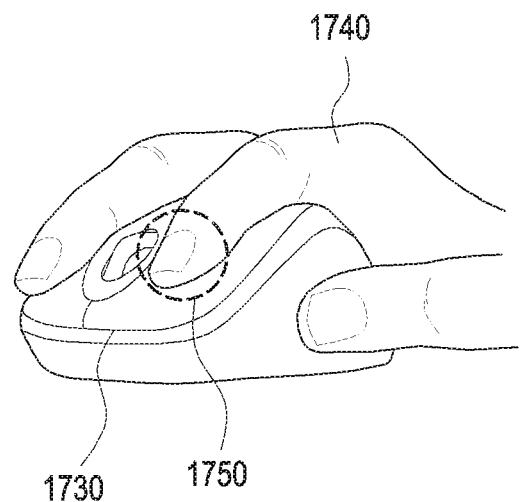
FIG. 17B is a view illustrating an example device of inputting a user's biometric information according to various embodiments.

FIG. 17A is a view illustrating an example device of inputting a user's biometric information according to various embodiments. FIG. 17B is a view illustrating an example device of inputting a user's biometric information according to various embodiments.

According to various embodiments, an electronic device may provide a payment function in interoperation with various input devices, e.g., a mouse, which may obtain the user's biometric information. Referring to FIG. 17A, if the user searches the PC screen 1700 and discovers an image, video, or text (e.g., 1720 of FIG. 17A) he or she desires to purchase, there may be provided a payment function for the product associated with the image, video, or text using a mouse button 1710 over the image, video, or text. Referring to FIG. 17B, the mouse 1730 may have a biometric sensor 1750 for obtaining biometric information from the user 1740.

According to various embodiments, the user may discover the product related to an object he or she desires to purchase while searching the screen displayed on the electronic device and click both the left and right buttons of the mouse over the object to thereby transfer information related to the object to the electronic device or other electronic device account-shared with the web browser. The electronic device may obtain payment information associated with the selected object from the memory, display the payment information on the screen, and then provide a payment function for the product present on the screen currently in use by way of only the user's fingerprint scanning action.

Figure 18:
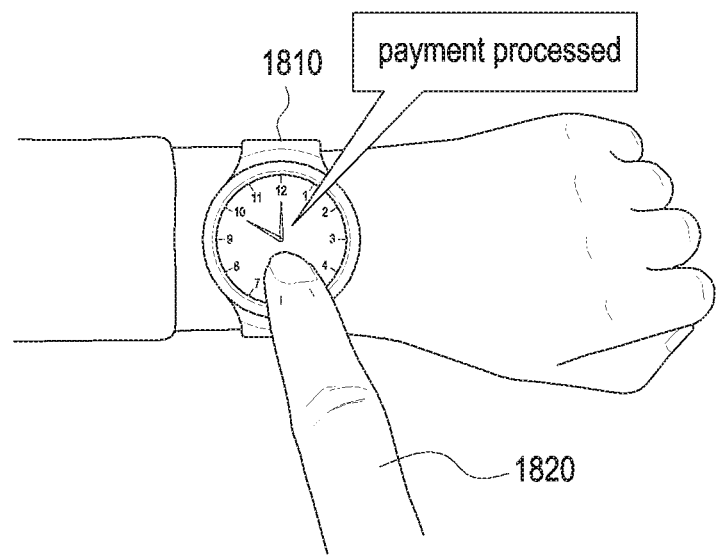
FIG. 18 is a view illustrating an example device of inputting biometric information according to other embodiments.

FIG. 18 is a view illustrating an example device of inputting biometric information according to other embodiments.

According to various embodiments, without limitations to the enumerated mouse or biometric sensor (e.g., fingerprint sensor) for the purchasing and specifying operations, the user may identify the intent to purchase using one or more input devices capable of sensing. In other words, intents to purchase, identified by the input fingerprint and the user's voice command may be combined to identify the intent. For example, there may be provided a smart watch 1810 with a biometric sensor capable of recognizing the user (1820)'s biometric information as shown in FIG. 18. The smart watch 1810 may interwork with the user's electronic device, laptop computer or personal computer and may recognize the user's biometric information or payment command and provide a payment function for objects through the biometric sensor of the smart watch.

Figure 19A:
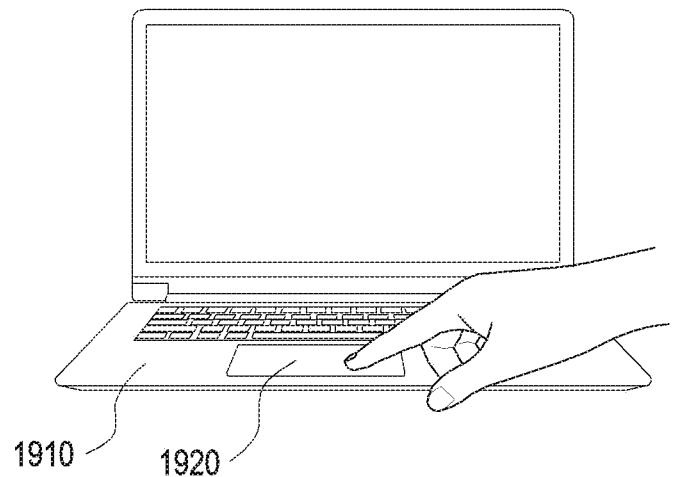
FIG. 19A is a view illustrating an example device of inputting biometric information according to various embodiments.
Figures 19B, 19C:
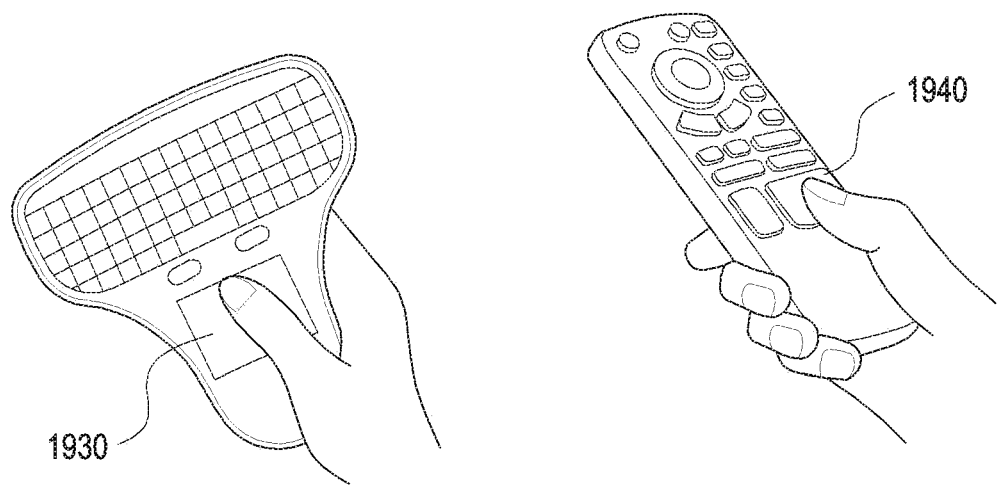
FIG. 19B is a view illustrating an example device of inputting biometric information according to various embodiments.
FIG. 19C is a view illustrating an example device of inputting biometric information according to various embodiments.

FIG. 19A is a view illustrating an example device for inputting biometric information according to various embodiments. FIG. 19B is a view illustrating an example device of inputting biometric information according to various embodiments. FIG. 19C is a view illustrating an example device of inputting biometric information according to various embodiments.

The above-described personalized payment method may apply likewise to biometric sensor-equipped personal computers, such as laptop computers. For example, the user's biometric information and payment command may be recognized through the mouse pad 1920 included in the laptop computer 1910 of FIG. 19A, the touch pad 1930 of FIG. 19B, or the touch pad 1940 included in the remote controller of FIG. 19C, and a payment function for the product corresponding to the object may be provided. The touch pad functionally connected with the electronic device may include a biometric sensor. According to an embodiment, the electronic device may recognize the user's fingerprint corresponding to the user's pressure input while simultaneously differentiating the object, e.g., image, video, or text, which the mouse pointer is currently indicating.

Figure 20A:
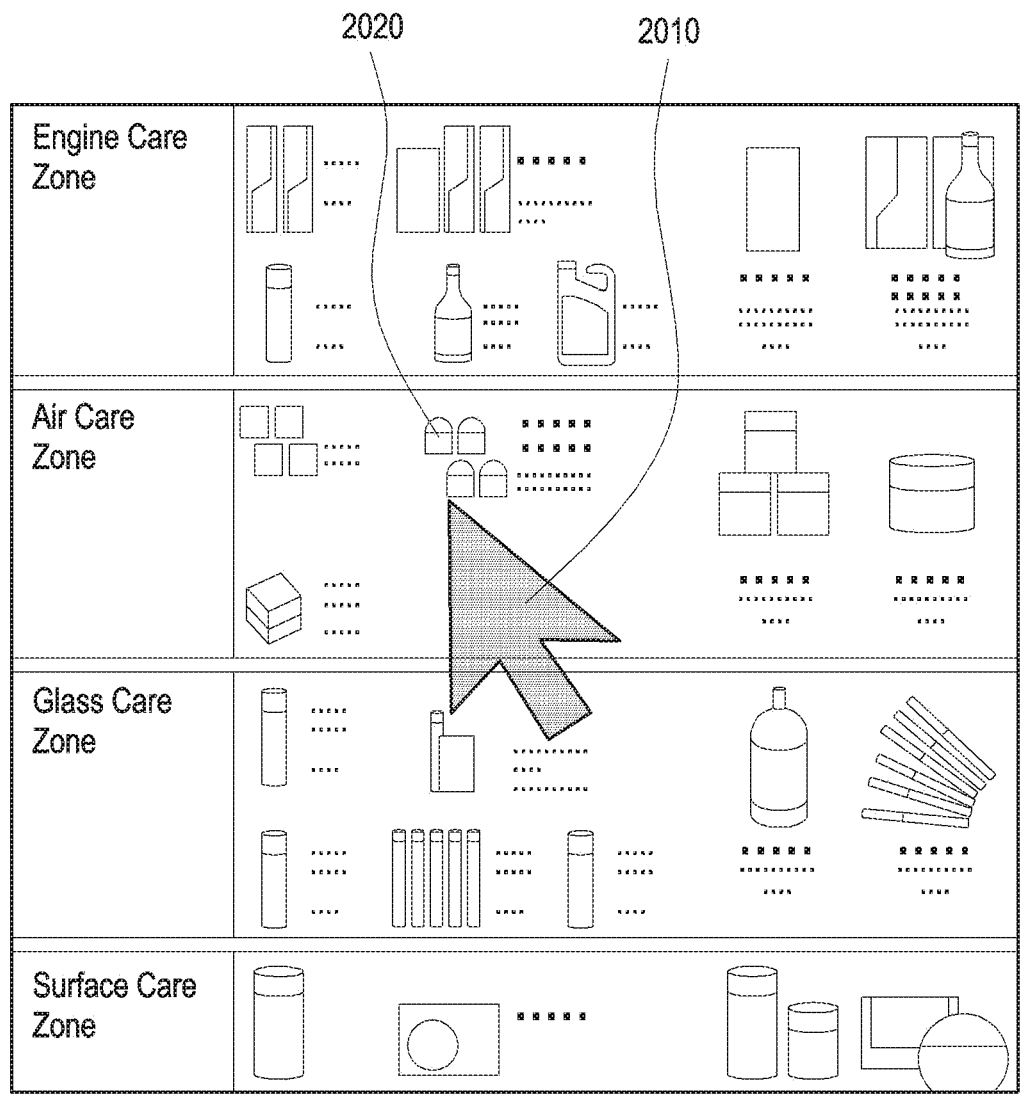
FIG. 20A is a view illustrating an example configuration of providing a payment function on a website by an electronic device according to various embodiments.
Figure 20B:
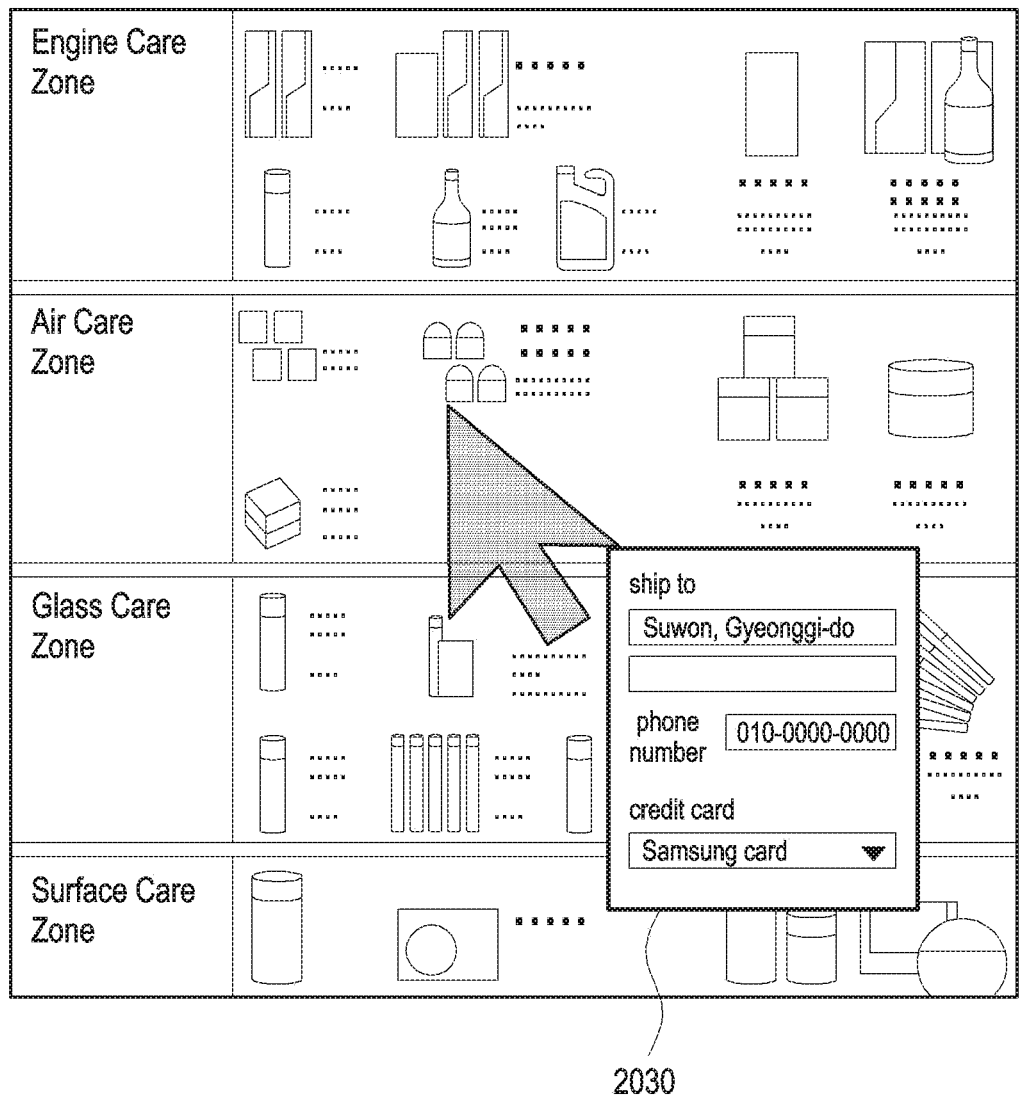
FIG. 20B is a view illustrating an example configuration of providing a payment function on a website by an electronic device according to various embodiments.

FIG. 20A is a view illustrating an example configuration of providing a payment function on a website by an electronic device according to various embodiments. FIG. 20B is a view illustrating an example configuration of providing a payment function on a website by an electronic device according to various embodiments.

Referring to FIG. 20A, according to various embodiments, a processor (e.g., the processor 120 of FIG. 1) may differentiate and extract the product associated with the object 2020 the pointer 2010 indicates. Referring to FIG. 20B, the processor (e.g., the processor 120 of FIG. 1) may combine information about the store where the product extracted as shown in FIG. 20A may be purchased and the user's personal information, configure a product purchase-related webpage 2030 in the form of, e.g., a popup window, and provide it to the user. The electronic device may perform substantial payment for the product corresponding to the user's payment command. According to an embodiment, the user may make a payment precisely, quickly, and conveniently using the product sale website the user prefers or the system recommends using only the user's payment means without depending on a particular purchase website.

Figure 21:
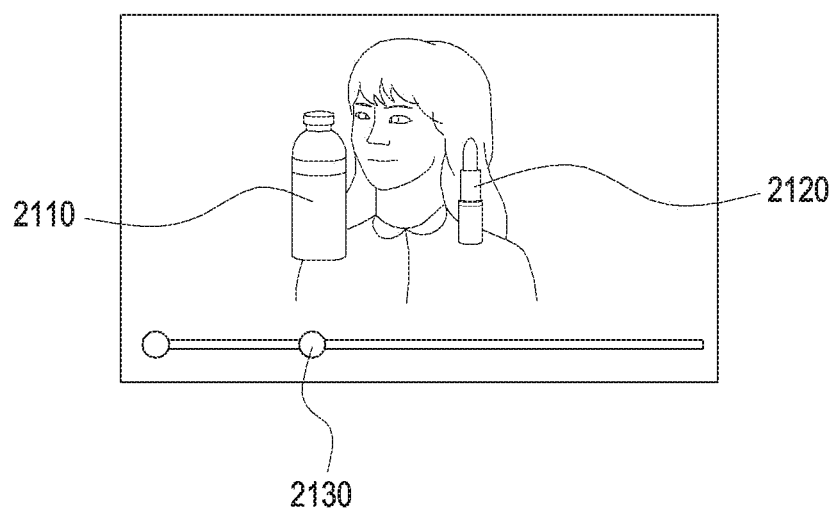
FIG. 21 is a view illustrating an example configuration of proceeding with payment for an object using an image of a video according to various embodiments.

FIG. 21 is a view illustrating an example configuration of proceeding with payment for an object using an image of a video according to various embodiments.

Referring to FIG. 21, according to various embodiments, payment information about at least one object may be stored in a video based on time information and position information about a video file. For example, a processor (e.g., the processor 120 of FIG. 1) of an electronic device or an external server may store, in the video, information about a first object 2110 and a second object 2120 included in the image of a particular position 2130 in the video. When the user's touch on any one of the first object 2110 and the second object 2120 is sensed, the processor (e.g., the processor 120 of FIG. 1) may recognize the object based on at least one of the time information about the selected object or position information in the image and may provide a payment function for the object based on what has been described above.

Figure 22:
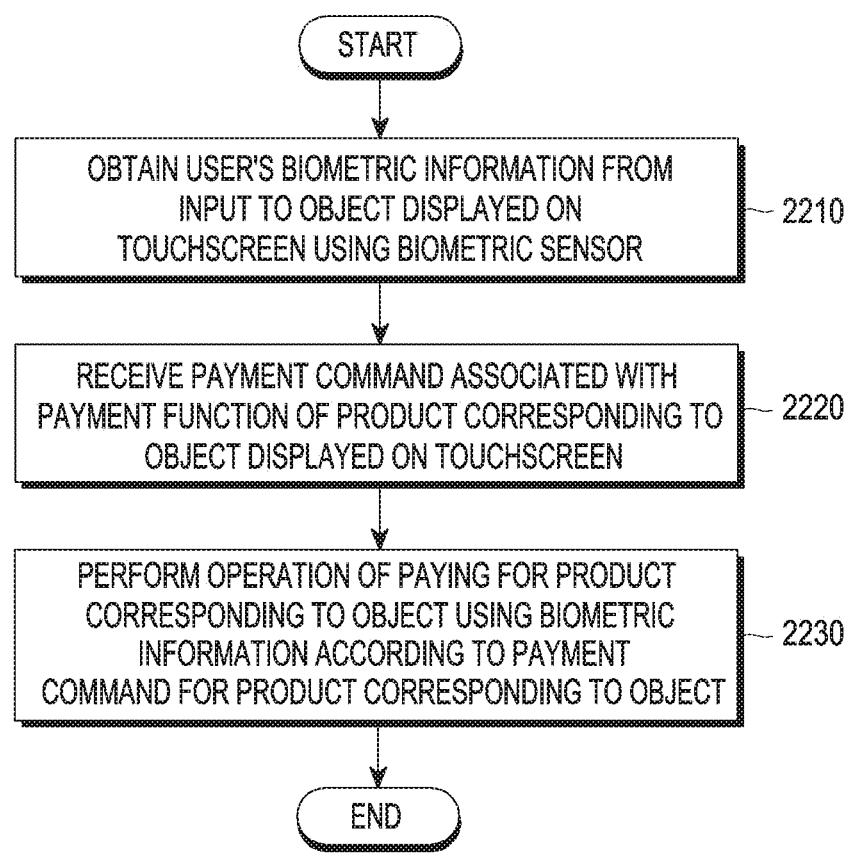
FIG. 22 is a flowchart illustrating a method of paying for a display object according to various embodiments.

FIG. 22 is a flowchart illustrating a method of paying for a display object according to various embodiments.

Referring to FIG. 22, according to various embodiments, in operation 2210 of a method of performing payment, a processor (e.g., the processor 120 of FIG. 1) may obtain a user's biometric information from an input to an object displayed through the touchscreen using a biometric sensor. According to an embodiment, in operation 2220, the processor (e.g., the processor 120 of FIG. 1) may receive a payment command associated with the payment function for the product corresponding to the object displayed through the touchscreen. In operation 2230, the processor (e.g., the processor 120 of FIG. 1) may perform the operation of paying for the product corresponding to the object using the payment information according to the payment command for the product corresponding to the object. According to an embodiment, in the method, the processor (e.g., the processor 120 of FIG. 1) may perform the operations of displaying an image including an object through the touchscreen, recognizing the object from the image based on an input to the object, and providing payment information about a product corresponding to the recognized object through a graphical user interface. According to an embodiment, in the method, the processor (e.g., the processor 120 of FIG. 1) may include the operations of receiving the payment information for the object from the memory or external server storing the payment information for the product corresponding to the object and performing a payment function for the product corresponding to the object using the received payment information. According to an embodiment, in the method, the processor (e.g., the processor 120 of FIG. 1) may include the operation of, upon determining that the electronic device is moved in a predetermined motion pattern through at least one sensor, determining that the motion pattern of the electronic device is the payment command. According to an embodiment, in the method, the processor (e.g., the processor 120 of FIG. 1) may include the operation of providing information (e.g., product name, price, store, or URL information) about the product corresponding to at least one other object related to the object based on at least one of the user's information (e.g., shipping address, contact information, or payment information) or meta data for the product purchase history corresponding to the user's object. According to an embodiment, in the method, the processor (e.g., the processor 120 of FIG. 1) may include the operations of, upon receiving an input to drag the object to a predetermined partial screen area, displaying the object on the predetermined partial screen area through the touchscreen and, upon receiving a predetermined operation on the partial screen area and a payment command associated with the payment function for the product corresponding to the object, paying for the product corresponding to the object. According to an embodiment, in the method, the processor (e.g., the processor 120 of FIG. 1) may include the operations of displaying a video including the object through the touchscreen and, according to the user's input to the video including the object, recognizing the object stored in association with time information and position information of the video. According to an embodiment, in the method, if a camera application runs and at least one object is displayed through the touchscreen, the processor (e.g., the processor 120 of FIG. 1) may include the operation of recognizing the object where an input is received among the at least one object displayed. The same description given for the electronic device performing payment applies to the method of controlling the electronic device performing payment, and no description of the method is presented below.

Figure 23:
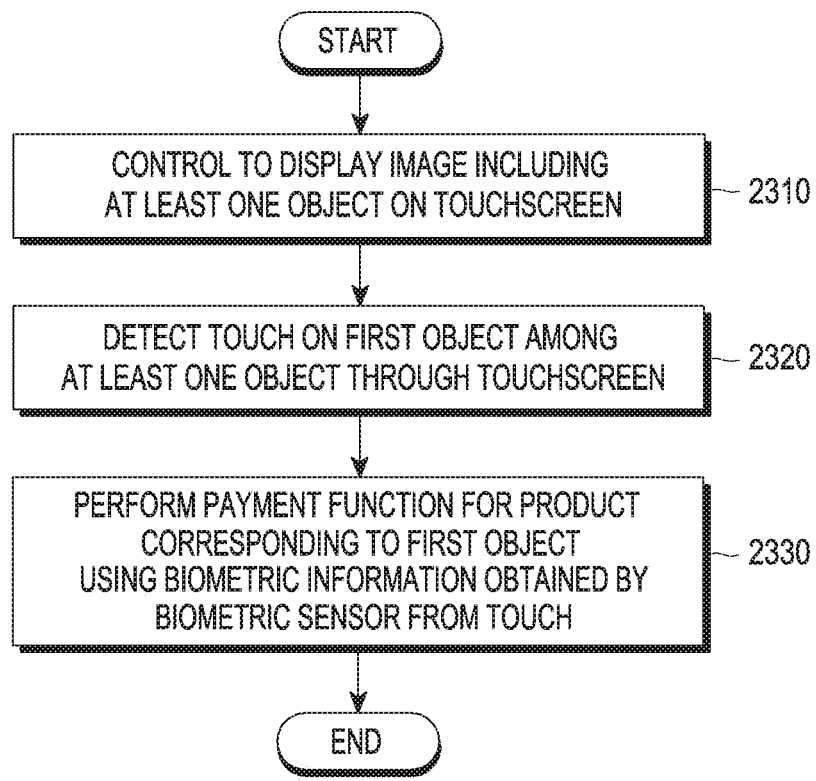
FIG. 23 is a flowchart illustrating a method of paying for a display object according to various embodiments.

FIG. 23 is a flowchart illustrating a method of performing payment according to various embodiments.

According to various embodiments, in operation 2310 of the method of performing payment, the processor (e.g., the processor 120 of FIG. 1) may perform control to display an image including at least one object on the touchscreen. In operation 2320, the processor (e.g., the processor 120 of FIG. 1) may detect a touch to a first object among the at least one object through the touchscreen. In operation 2330, the processor (e.g., the processor 120 of FIG. 1) may perform a payment function for the product corresponding to the first object using the biometric information that the biometric sensor obtains from the touch. According to an embodiment, in the method, the processor (e.g., the processor 120 of FIG. 1) may perform the operations of displaying an image including a first object through the touchscreen, recognizing the object from the image based on an input to the object, and providing payment information about a product corresponding to the recognized first object through a graphical user interface. According to an embodiment, in the method, the processor (e.g., the processor 120 of FIG. 1) may include the operations of receiving the payment information for the product corresponding to the first object from the memory or external server storing the payment information for the product corresponding to the first object and performing a payment function for the product corresponding to the first object using the received payment information. According to an embodiment, in the method, the processor (e.g., the processor 120 of FIG. 1) may include the operation of, upon determining that the electronic device is moved in a predetermined motion pattern through at least one sensor, determining that the motion pattern of the electronic device is the payment command. According to an embodiment, in the method, the processor (e.g., the processor 120 of FIG. 1) may include the operation of providing information of at least one second object related to the first object based on at least one of information corresponding to the user or meta data for the user's object purchase history. According to an embodiment, in the method, the processor (e.g., the processor 120 of FIG. 1) may include the operations of, upon receiving an input to drag the first object to a predetermined partial screen area, displaying the first object on the predetermined partial screen area through the touchscreen and, upon receiving a predetermined operation on the partial screen area and a payment command associated with the payment function for the object, providing a payment function for the product corresponding to the first object. According to an embodiment, in the method, the processor (e.g., the processor 120 of FIG. 1) may include the operations of displaying a video including the first object through the touchscreen and, according to the user's input to the video including the first object, recognizing the first object stored in association with time information and position information of the video. According to an embodiment, in the method, if a camera application runs and at least one object is displayed through the touchscreen, the processor (e.g., the processor 120 of FIG. 1) may include the operation of recognizing the first object where an input is received among the at least one object displayed. The same description given for the electronic device performing payment applies to the method of controlling the electronic device performing payment, and no description of the method is presented below.

Figure 24:
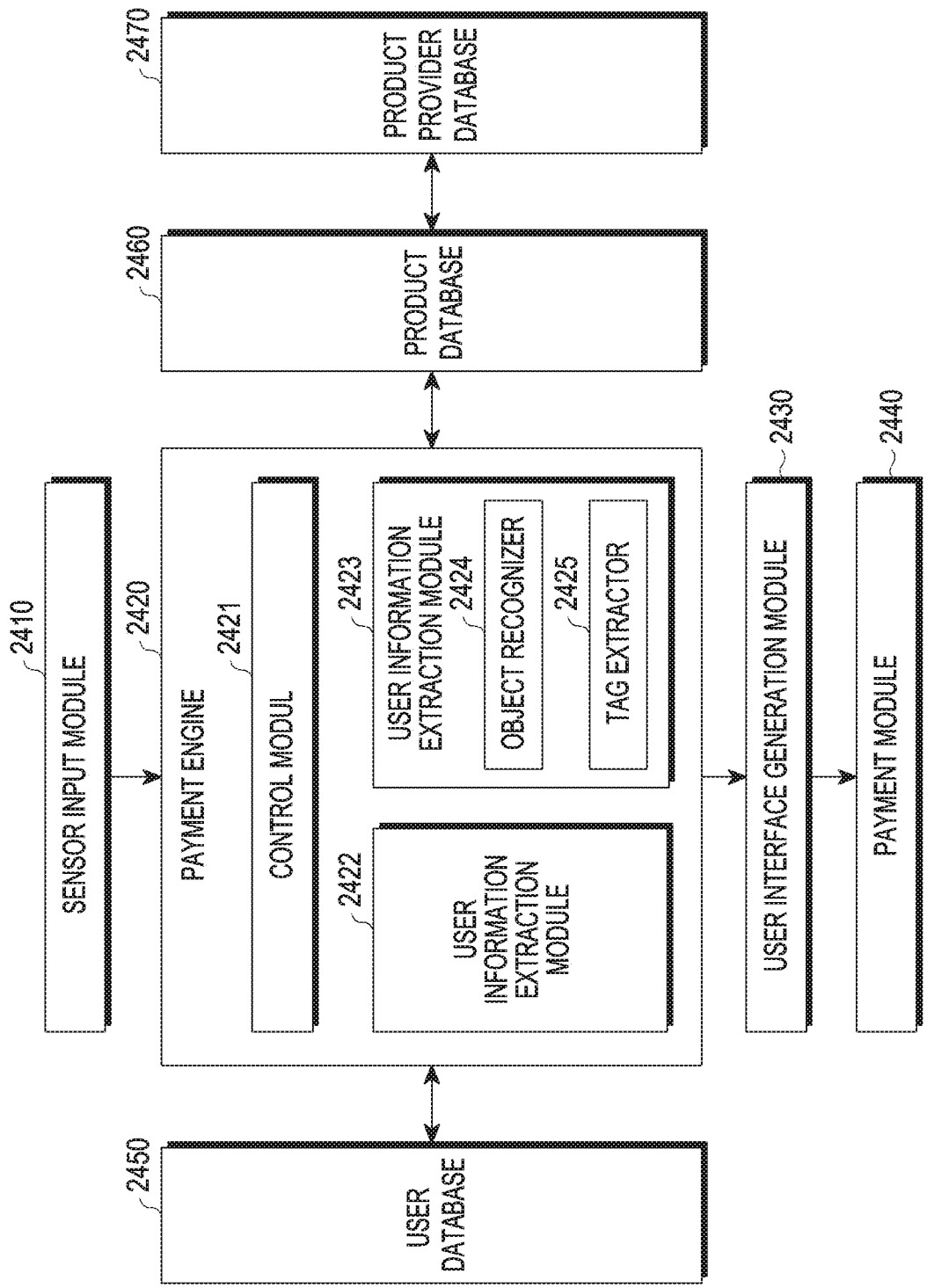
FIG. 24 is a block diagram illustrating an example of an electronic device performing payment according to various embodiments.

FIG. 24 is a block diagram illustrating an example electronic device of performing payment according to various embodiments.

According to various embodiments, an electronic device may include a sensor input module 2410, a payment engine 2420, a user interface generation module 2430, a payment module 2440, a user database 2450, a product database 2460, and a product provider database 2470. Each module may be implemented in software or in hardware.

The sensor input module 2410 may be a module for receiving signals from the outside of the electronic device and may be a physical sensor, such as a touch sensor and pressure sensor, a fingerprint sensor, a geo-magnetic sensor, an acceleration sensor, an air pressure sensor, a pressure sensor, or a camera. The sensor input module 2410 plays a role to receive inputs from the outside of the electronic device and transfer the inputs to the payment engine 2420. For example, the sensor input module 2410 may sense the user's touch input or force input and differentiate the coordinates on the touchscreen where the pressure input is applied and, at this time, transfer the input of the fingerprint sensor, which has been entered together, to the payment engine 2420.

According to an embodiment, the payment engine 2420 performs the overall control on the payment process for the product corresponding to the object. According to an embodiment, the payment engine 2420 may include a control module 2421, a user information extraction module 2422, and a product information extraction module 2423.

According to an embodiment, the payment engine 2420 may transfer the sensor input information received from the sensor input module 2410 and context-related information displayed on the current screen to the user information extraction module 2422 and the product information extraction module 2423, extract information necessary for payment for the product corresponding to the object from each connected database, and transfer the information to the user interface generation module 2430.

For example, the payment engine 2420 may receive fingerprint input information and touch coordinate position from the sensor input module 2410. At this time, the payment engine 2420 may transfer the received fingerprint input information to the user information extraction module 2422. The user information extraction module 2423 may compare the fingerprint information received from the user with the user database 2450 present inside or outside the electronic device to thereby recognize the user and read in the user's payment-related information, e.g., at least one or more pieces of information of the user's name, contact information, shipping address information, card usage history information, or preferred product store. Further, the payment engine 2420 may receive the touch input coordinates along with the screen information at the time of a pressure being applied and transfer them to the product information extraction module 2423. According to an embodiment, the product information extraction module 2423 may recognize the object the user selected through such a method as, e.g., image recognition, image comparison, or text recognition based on the received coordinates, search the product database 2460 for information about the so-recognized object, and read in the price information, store information, or other purchase-related information about the product. According to an embodiment, the product information extraction module 2423 may receive content information displayed on the screen at the time of the input having been received and read in additional information, such as tag information, present in the content to thereby differentiate the purchase-related information. For example, in a case where the user selects a photo, the product information extraction module 2423 may read in product-related information among various pieces of information present in the meta tag of the photo. The payment engine 2420 may compare the read-in product information with the registered product database 2460 and may thus read in purchase-related information, such as the price information or store information about the product. According to an embodiment, if the user applies an input to the object while viewing the webpage, the object recognizer 2424 of the user information extraction module 2423 may recognize the object included in the webpage, and the tag extractor 2425 may extract the product-related information regarding the product corresponding to the object from the tag information or additional information about the object to thereby read in the purchase-related information, such as the price information or store information about the product.

According to various embodiments, the user interface generation module 2430 is a module to configure a screen using information transferred from the payment engine 2420 and is a module to primarily produce a screen which is actually provided to the user through the display. The user interface generation module 2430 may dynamically produce a user interface screen including product information specified by the payment engine 2420 and purchase information thereabout. According to an embodiment, the user interface generation module 2430 may display together, on the screen, similar information related to the product information specified by the payment engine 2420 through the memory. Further, the user interface generation module 2430 may merge such payment-related information as shipping address information or contact information with the product information and display the merged information on the screen. To configure a screen, the user interface generation module 2430 may configure an integrated user interface in such a manner as to place the information received from the payment engine 2420 on one of default templates stored. As another method, the user interface generation module 2430 may split the screen into a payment page and a product information page to thereby provide a split user interface. As a portion for displaying product information in the split user interface, the product information webpage the product supplier provides may be used. The payment page may be a page which may interwork with the product provider page and this page may be configured as the electronic device obtains information from the product information page.

According to an embodiment, the user interface generation module 2430 may configure a screen using the information received from the payment engine 2420. According to an embodiment, the user interface generation module 2430 may configure a user interface using the information about the product corresponding to the object specified by the payment engine 2420 and information about the store where the product may be purchased, or the user interface generation module 2430 may fetch the corresponding page registered by a third party and display the same at the top of the user interface and perform actual payment through the payment module 2440. Here, the electronic device may log into the product store using, e.g., electronic device information or user account information stored in the electronic device. According to an embodiment, the payment module 2440 is a module which actually performs payment and may perform actual payment using payment-related information stored in a security area corresponding to the user's payment authorization input.

According to an embodiment, the payment module 2440 may provide, through the user interface, a configuration which enables purchase of the product through the user interface generation module 2430 for the product information proposed by the payment engine 2420 for processing payment for the product and may obtain the stored payment information and attempt MST/NFC payment. For example, the payment operation the user intends may be one which interworks with an external device as the payment information is sent to the external device using saved payment information and the payment module 2440 may detect the confirmation of payment for the purchase on the product information page produced by the user interface generation module and provide the operation for purchasing the product. According to an embodiment, the payment module 2440 may send a request for a user interface interworking with the payment process to the user interface generation module 2430. For example, the user interface generation module 2430 may produce a webpage including information when the payment is in progress according to the request from the payment module 2440 or a webpage when the process has been done and provide the webpage to the user.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

The invention claimed is:

1. An electronic device, comprising:
a touchscreen;
a biometric sensor disposed to overlap at least a portion of the touchscreen; and
a processor configured to:
control the touchscreen to display at least one image including at least one object,
based on a first touch input on a first object, wherein the first object is included in a first image displayed on the touchscreen among the at least one image:
recognize the first object in the first image;
obtain biometric information of a user from the first touch input through the biometric sensor;
identify, based on the biometric information, the user;
identify user information stored in a memory of the electronic device, the user information including a purchase history of the user for a first product corresponding to the first object;
identify a preset reference related to a price of the first product corresponding to the first object and a reliability of a website selling the first product corresponding to the first object;
based on the purchase history of the user and the preset reference, determine the website selling the first product corresponding to the first object; and
based on information related to the determined website, control the touchscreen to display a payment interface including information related to the first product and a payment of the first product,
based on receiving an input to drag the first product to a predetermined partial screen area on the payment interface displayed on the touchscreen, control the touchscreen to move the first product to the predetermined partial screen area, control the touchscreen to display the first product and a second product moved before the first product on the predetermined partial screen area, wherein the second product corresponds to a second object recognized in a second image among the at least one image, based on receiving an input to swipe up the predetermined partial screen area, control the touchscreen to display a batch payment interface for a batch payment of the first product and the second product, and based on a second touch input on the batch payment interface displayed on the touchscreen, perform an operation for the batch payment of the first product and the second product.

2. The electronic device of claim 1, further comprising:
a memory,
wherein the processor is further configured to:
receive payment information about the first object from the memory or an external server.

3. The electronic device of claim 1, further comprising:
at least one sensor,
wherein the processor is further configured to:
based on determining that the electronic device is moved in a predetermined motion pattern by using the at least one sensor in response to displaying the payment interface, determine the predetermined motion pattern of the electronic device as a payment command causing the processor to perform an operation for the payment of the first product.

4. The electronic device of claim 1,
wherein the first image is included in a video, the video including information on a time point which the first image including the first object is displayed within a time line of the video and information on a position of the first object in the first image, and
wherein the processor is further configured to:
recognize the first object based on the information on the time point and the information the position of the first object in the first image.

5. The electronic device of claim 1, further comprising:
a camera,
wherein the processor is further configured to:
control the touchscreen to display the first image obtained through the camera.

6. A method of controlling an electronic device performing payment, the method comprising:
controlling a touchscreen of the electronic device to display at least one image including at least one object;
based on a first touch input on a first object, wherein the first object is included in a first image displayed on the touchscreen among the at least one image:
recognizing the first object in the first image,
obtaining biometric information of a user from the first touch input through a biometric sensor of the electronic devices,
identifying, based on the biometric information, the user,
identifying user information stored in a memory of the electronic device, the user information including a purchase history of the user for a first product corresponding to the first object,
identifying a preset reference related to a price of the first product corresponding to the first object and a reliability of a website selling the first product corresponding to the first object,
based on the purchase history of the user and the preset reference, determining the website selling the first product corresponding to the first object, and
based on information related to the determined website, controlling the touchscreen to display a payment interface including information related to the first product and a payment of the first product;
based on receiving an input to drag the first product to a predetermined partial screen area on the payment interface displayed on the touchscreen, controlling the touchscreen to move the first product to the predetermined partial screen area;
controlling the touchscreen to display the first product and a second product moved before the first product on the predetermined partial screen area, wherein the second product corresponds to a second object recognized in a second image among the at least one image;
based on receiving an input to swipe up the predetermined partial screen area, controlling the touchscreen to display a batch payment interface for a batch payment of the first product and the second product; and
based on a second touch input on the batch payment interface displayed on the touchscreen, performing an operation for the batch payment for of the first product and the second product.

7. The method of claim 6, further comprising:
receiving payment information about the first product from a memory of the electronic device or an external server storing.

8. The method of claim 6, further comprising:
based on determining that the electronic device is moved in a predetermined motion pattern by using at least one sensor of the electronic device in response to displaying the payment interface, determining that the predetermined motion pattern of the electronic device as a payment command causing a processor of the electronic device to perform an operation for the payment of the first product.

9. The method of claim 6,
wherein the first image is included in a video, the video including information on a time point which the first image including the first object is displayed within a time line of the video and information on a position of the first object in the first image, and
wherein the method further comprises:
recognizing the first object, based on the information on the time point and the information the position of the first object in the first image.

* * * * *